US007120773B2

(12) United States Patent
Yoshioka et al.

(10) Patent No.: US 7,120,773 B2
(45) Date of Patent: Oct. 10, 2006

(54) APPARATUS AND METHOD FOR MEMORY MANAGEMENT

(75) Inventors: Shirou Yoshioka, Nishinomiya (JP); Hirofumi Kaneko, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 333 days.

(21) Appl. No.: 10/701,073

(22) Filed: Nov. 5, 2003

(65) Prior Publication Data

US 2004/0139282 A1 Jul. 15, 2004

(30) Foreign Application Priority Data

Nov. 5, 2002 (JP) ............................ 2002-321669

(51) Int. Cl.
*G06F 12/02* (2006.01)

(52) U.S. Cl. ....................... 711/165; 711/154; 711/203; 718/105

(58) Field of Classification Search ..................... None
See application file for complete search history.

(56) References Cited

U.S. PATENT DOCUMENTS 5,602,987 A * 2/1997 Harari et al. .................. 714/8
5,737,742 A * 4/1998 Achiwa et al. ............. 711/103
5,930,193 A * 7/1999 Achiwa et al. ........ 365/230.03
6,000,006 A * 12/1999 Bruce et al. ................ 711/103
6,957,158 B1 * 10/2005 Hancock et al. .............. 702/61
2003/0058681 A1 * 3/2003 Coulson ..................... 365/145
2003/0163633 A1 * 8/2003 Aasheim et al. ............ 711/103
2004/0243761 A1 * 12/2004 Bohrer et al. ............... 711/114

OTHER PUBLICATIONS

"FRAM Technology Backgrounder—An overview of FRAM Technology", Dec. 2000, Ramtron International Corporation; accessed at <http://www.ramtron.com/lib/literature/appnotes/FRAMTechBkgder.pdf>.*
"Wear.levelling" accessed at <http://en.wikipedia.org/wiki/Wear_levelling>.*

* cited by examiner

*Primary Examiner*—Brian R. Peugh
(74) *Attorney, Agent, or Firm*—McDermott Will & Emery LLP

(57) ABSTRACT

A TLB provided in a memory management apparatus stores an entry for each logical page, and each entry holds an address of a physical page mapped to a corresponding logical page, an index showing the degradation degree of the physical page, and an index showing the access frequency to the logical page. The memory management apparatus accesses a physical page mapped to a desired logical page according to the data stored in the TLB, periodically exchanges the contents between a first physical page mapped to a specific logical page having a largest access frequency index and a second physical page having a smallest degradation index, and then maps the specific logical page to the second physical page. Through the physical page exchange and corresponding mapping process, accesses to each physical page are distributed, so that degradation in storage function is substantially equalized.

6 Claims, 24 Drawing Sheets

20
CPU
A[19:0] D[7:0]
30
RAM
40
ROM
100
LOGICAL ADDRESS BUS
61
LOGICAL DATA BUS
62
13
TLB
ACACHE [7:0]
8
11
CONTROL CIRCUIT
MEMORY MANAGEMENT APPARATUS
10
CACHE MEMORY
12
ATRAN [7:0]
8
A[9:5]
5
13
256 (32 BYTES)
PHYSICAL ADDRESS BUS
71
PHYSICAL DATA BUS
72
APHY[12:0] DPHY[255:0]
FERAM
50

TLB 13
131
132
133
BUFFER 130
139
PHYSICAL PAGE ADDRESS
DEGRADATION INDEX
ACCESS FREQUENCY INDEX
00
01
FF
DECODER
ACACHE [7:0]
8
256 ENTRIES
ATRAN [7:0]

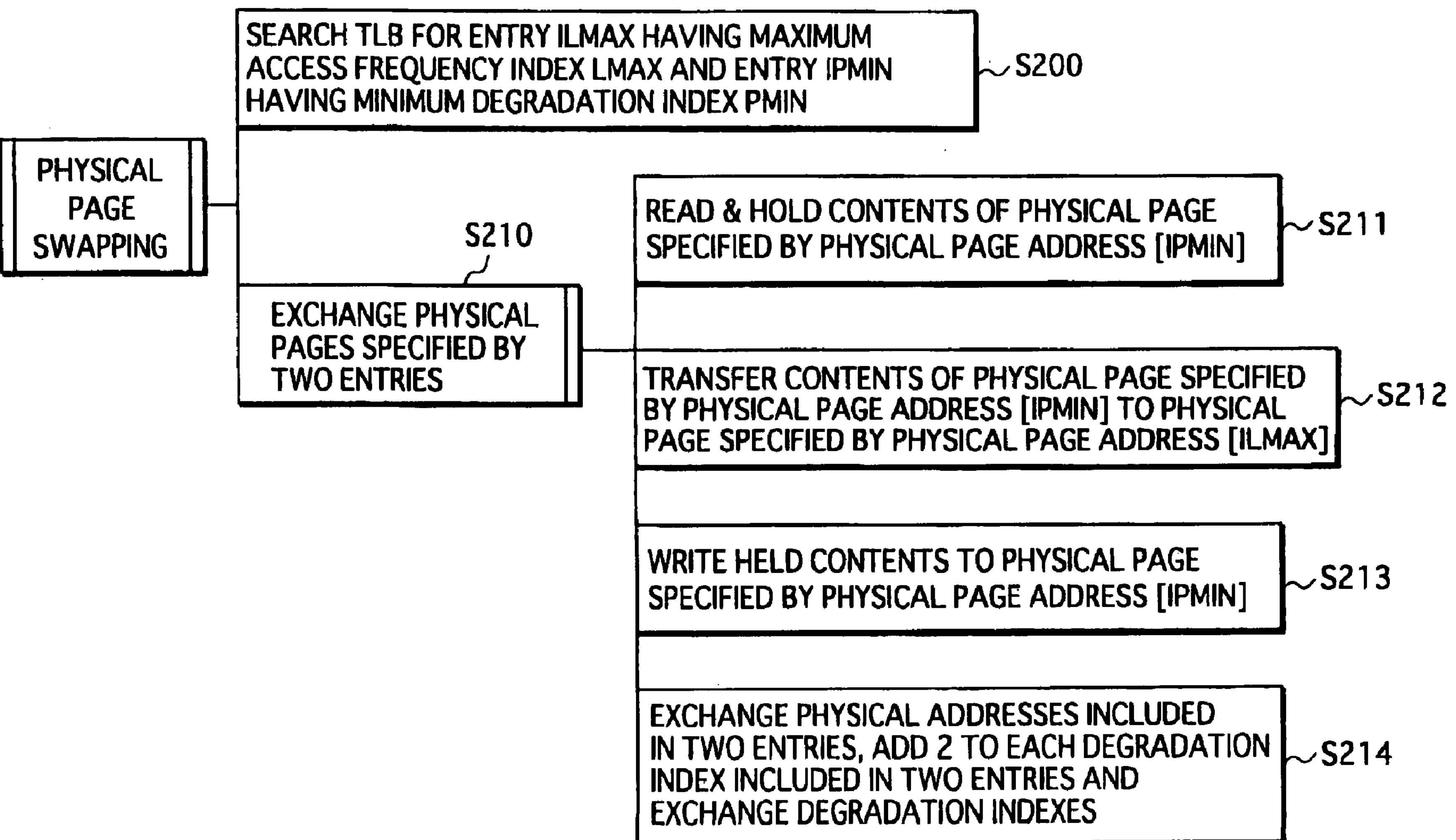
FIG.7
PHYSICAL PAGE SWAPPING
SEARCH TLB FOR ENTRY ILMAX HAVING MAXIMUM ACCESS FREQUENCY INDEX LMAX AND ENTRY IPMIN HAVING MINIMUM DEGRADATION INDEX PMIN
S200
S210
EXCHANGE PHYSICAL PAGES SPECIFIED BY TWO ENTRIES
READ & HOLD CONTENTS OF PHYSICAL PAGE SPECIFIED BY PHYSICAL PAGE ADDRESS [IPMIN]
S211
TRANSFER CONTENTS OF PHYSICAL PAGE SPECIFIED BY PHYSICAL PAGE ADDRESS [IPMIN] TO PHYSICAL PAGE SPECIFIED BY PHYSICAL PAGE ADDRESS [ILMAX]
S212
WRITE HELD CONTENTS TO PHYSICAL PAGE SPECIFIED BY PHYSICAL PAGE ADDRESS [IPMIN]
S213
EXCHANGE PHYSICAL ADDRESSES INCLUDED IN TWO ENTRIES, ADD 2 TO EACH DEGRADATION INDEX INCLUDED IN TWO ENTRIES AND EXCHANGE DEGRADATION INDEXES
S214

TIME
t0
t2
t3
t5
t6
PHYSICAL PAGE
FERAM 50
0
1
2
...
0 TIME
2 TIMES
4 TIMES
6 TIMES

TLB 13

| | FIG.11A | | | FIG.11B | | | FIG.11C | | | FIG.11D | | | FIG.11E | | |
|---|---|---|---|---|---|---|---|---|---|---|---|---|---|---|---|
| TIME | $t_0$ | | | $t_2$ | | | $t_3$ | | | $t_5$ | | | $t_6$ | | |
| ENTRY | PHYSICAL PAGE ADDRESS (121) | DEGRADATION INDEX (122) | ACCESS FREQUENCY INDEX (123) | PHYSICAL PAGE ADDRESS | DEGRADATION INDEX | ACCESS FREQUENCY INDEX | PHYSICAL PAGE ADDRESS | DEGRADATION INDEX | ACCESS FREQUENCY INDEX | PHYSICAL PAGE ADDRESS | DEGRADATION INDEX | ACCESS FREQUENCY INDEX | PHYSICAL PAGE ADDRESS | DEGRADATION INDEX | ACCESS FREQUENCY INDEX |
| 0 | 0 | 0 | 0 | 0 | 2 | 20 | 1 | 2 | 20 | 1 | 4 | 20 | 2 | 2 | 20 |
| 1 | 1 | 0 | 0 | 1 | 0 | 0 | 0 | 4 | 0 | 0 | 4 | 0 | 0 | 4 | 0 |
| 2 | 2 | 0 | 0 | 2 | 0 | 0 | 2 | 0 | 0 | 2 | 0 | 0 | 1 | 6 | 0 |
| ⋮ | | | | | | | | | | | | | | | |

CACHE FLUSH & TLB UPDATE
INITIALIZE ALL ELEMENTS OF ARRAY T[0:255] TO 0
S100
S110
N = 0 TO 3
S111
SELECT WAY N
S120
M = 0 TO 31
S121
SELECT LINE M
S122
VALID BIT [N, M] = 1?
YES
READ LOGICAL PAGE ADDRESS[N,M] TO L
S131
SELECT TLB ENTRY L
S132
S135
DIRTY BIT [N,M] = 1?
YES
S136
T[L] ← 2
WRITE CACHE DATA [N,M] TO FERAM
S137
NO
IF T[L] = 0, THEN T[L] ← 1
S138
VALID BIT[N, M], DIRTY BIT[N,M] ← 0
S339
S150
L = 0 TO 255
S151
SELECT TLB ENTRY L
S152
ADD T[L] TO DEGRADATION INDEX
S353
ADD T[L] TO ACCESS FREQUENCY INDEX

TIME
$t_0$
$t_2$
$t_3$
$t_5$
$t_6$
PHYSICAL PAGE
FERAM 50
0
1
2
0 TIME
2 TIMES
4 TIMES
6 TIMES

TLB 13

FIG.16A

TIME $t_0$

| ENTRY | PHYSICAL PAGE ADDRESS (121) | DEGRA-DATION INDEX (122) | ACCESS FRE-QUENCY INDEX (123) |
|---|---|---|---|
| 0 | 0 | 0 | 0 |
| 1 | 1 | 0 | 0 |
| 2 | 2 | 0 | 0 |
| ⋮ | | | |

FIG.16B

TIME $t_2$

| ENTRY | PHYSICAL PAGE ADDRESS | DEGRA-DATION INDEX | ACCESS FRE-QUENCY INDEX |
|---|---|---|---|
| 0 | 0 | 2 | 2 |
| 1 | 1 | 0 | 0 |
| 2 | 2 | 0 | 0 |
| ⋮ | | | |

FIG.16C

TIME $t_3$

| ENTRY | PHYSICAL PAGE ADDRESS | DEGRA-DATION INDEX | ACCESS FRE-QUENCY INDEX |
|---|---|---|---|
| 0 | 1 | 2 | 2 |
| 1 | 0 | 4 | 0 |
| 2 | 2 | 0 | 0 |
| ⋮ | | | |

FIG.16D

TIME $t_5$

| ENTRY | PHYSICAL PAGE ADDRESS | DEGRA-DATION INDEX | ACCESS FRE-QUENCY INDEX |
|---|---|---|---|
| 0 | 1 | 4 | 4 |
| 1 | 0 | 4 | 0 |
| 2 | 2 | 0 | 0 |
| ⋮ | | | |

FIG.16E

TIME $t_6$

| ENTRY | PHYSICAL PAGE ADDRESS | DEGRA-DATION INDEX | ACCESS FRE-QUENCY INDEX |
|---|---|---|---|
| 0 | 2 | 2 | 4 |
| 1 | 0 | 4 | 0 |
| 2 | 1 | 6 | 0 |
| ⋮ | | | |

ROUTINE B
ROUTINE C
ROUTINE A
81
200
20
80
30
40
CPU A[19:0] D[7:0]
CD-ROM I/F
RAM
ROM
LOGICAL ADDRESS BUS
61
LOGICAL DATA BUS
62
93
MEMORY MANAGEMENT APPARATUS
90
91
TLB
CONTROL CIRCUIT
ATRAN [7:0]
8
A[9:5]
5
256
13
(32 BYTES)
PHYSICAL ADDRESS BUS
PHYSICAL DATA BUS
71
72
APHY[12:0] DPHY[255:0] FERAM
50

TLB 93
BUFFER 930
LOGICAL ADDRESS A[19:0]
131
932
933
934
935
939
PHYSICAL PAGE ADDRESS
DEGRADATION INDEX
ACCESS FREQUENCY INDEX
GENERIC LOGICAL ADDRESS
COMPARATOR CIRCUIT
9351
9352
9353
9354
DECODER
LOGICAL ADDRESS A[17:10]
00
01
02
FF
+1
00000
00000
00800
3FD00
256 ENTRIES
ATRAN [7:0]
8

FIG.20

TLB 13

| ENTRY | PHYSICAL PAGE ADDRESS (131) | DEGRADATION INDEX (132) | ACCESS FREQUENCY INDEX (133) |
|---|---|---|---|
| 0 | 00 | 00 | 4 |
| 1 | 01 | 00 | 2 |
| 2 | 02 | 00 | 1 |
| 3 | 03 | 00 | 1 |
| 4 | 04 | 00 | 1 |
| ⋮ | | | |

12
CACHE MEMORY
WAY 0
WAY 1
WAY 2
WAY 3
CACHE ACCESS FREQUENCY INDEX
32 LINES
LOGICAL ADDRESS A[9:5] (LINE SELECTION SIGNAL)
ACCESS FREQUENCY INDEX (COMPARISON VALUE)
111
112
113
114
115
116
117
REP0
REP1
REP2
REP3
DECISION CIRCUIT
110

APPARATUS AND METHOD FOR MEMORY MANAGEMENT

This application is based on an application No. 2002-321669 filed in Japan, the content of which is hereby incorporated by reference.

BACKGROUND OF THE INVENTION (1) Field of the Invention

The present invention relates to an apparatus and a method for memory management, and especially to technology for leveling degrees of degradation of a memory device at locations resulting from accesses made to the locations.

(2) Description of the Related Art

Memory devices of a certain type have a characteristic that a location in a memory area degrades as a result of a data erase operation performed to the location. Such memory devices include flash memory devices. When a number of erase operations are performed intensively to a specific location of a flash memory, the specific location degrades outstandingly and eventually fails to store data. As a result, the memory device comes to the end of its usable life earlier than expected.

For this reason, a flash memory device requires memory management for distributing erase operations over the entire memory area of the flash memory device to maximize its usable life.

Due to its structure, a flash memory device has access constraints that bits may be set on an individual basis, but the bits once set need to be reset collectively in units called physical blocks.

For this reason, an access to a flash memory device is often made in units of physical blocks. Typically, the flash memory device writes data into an empty physical block in which all the bits are reset, by setting individual bits in the physical block as required. When the data is no longer needed, the flash memory device erases the data by resetting all the bits in the physical block collectively at the same time. Consequently, the physical block is available again for a next write operation.

In the above process, each bit constituting a physical block of the flash memory device degrades all at once every time the bits are reset to erase data.

JP Unexamined Patent, Application Publication No. 08-016482, for example, discloses a memory management technique made in view of the above-noted access constraints and degradation characteristics of a flash memory device.

FIG. 24 illustrates mapping according to the above conventional memory management technique between logical blocks, which are units of access from a super ordinate device, and physical blocks of a flash memory device.

According to the above technique, the flash memory device keeps counts of write operations and erase operations separately for each logical block.

When instructed to write data to a logical block having a large write count (i.e., frequently accessed), the flash memory device maps the logical block to an empty physical block having a small erase count (i.e., less degraded), and writes the data to the empty physical block.

As a result of this write operation, the number of empty physical blocks having a small write count decreases by one. Therefore, the flash memory device selects one currently used physical block having a small erase count, copies data stored in the selected physical block to another empty physical block, and subsequently erases the data in the selected physical block all at once. Consequently, there is another empty physical block having a small erase count.

Through the series of the above operations, all the physical blocks are made to have substantially even write counts, thereby avoiding a specific physical block degrading intensively. This leads to maximize the usable life of the flash memory.

In recent years, FeRAM (Ferroelectric Random Access Memory) devices, which are a future alternative to flash memory devices, are proceeding toward commercialization.

FeRAM devices are so structured to allow individual bits to be set or reset both on a bit-by-bit basis. Thus, an FeRAM device may be accessed on a bit-by-bit basis (practically, in units of a few bytes, which are the width of a bus).

In an FeRAM device, each bit degrades individually every time when the bit is set or reset as well as when the bit is referenced.

Therefore, in order to maximize its usable life, an FeRAM device also requires memory management to distribute write operations and read operations over an entire memory area of the memory device.

Unfortunately, however, the above conventional memory management for a flash memory is not applied to an FeRAM device without causing the following problems.

First of all, the conventional technique is made on the understanding that the data write operations are the only cause of degradation, and thus insufficient to correctly evaluate degradation of an FeRAM device because the degradation is caused also by a data read operation.

Second of all, the conventional technique is made based on the understanding that degradation takes place in units of a physical block and thus without consideration that degradation degrees may be nonuniform within one physical block. For this reason, the conventional technique is insufficient to suppress local degradation that may take place within one physical block of an FeRAM device due to its random access capability.

Lastly, although it is preferable to take some measures to reduce the absolute number of accesses especially in the case of an FeRAM, which is capable of fast access, the conventional technique fails to address the need.

SUMMARY OF THE INVENTION

The present invention is made to solve the problems noted above, and aims to provide an apparatus and a method for memory management suitable to maximize the usable life of a memory device that is capable of fast random access and that degrades as a result of both a data write operation and a data read operation.

In one aspect, the present invention provides a memory management apparatus for accessing a physical page mapped according to mapping information to a logical page that includes a logical address specified by an access request. The mapping information shows a one-to-one mapping between a plurality of logical pages and a plurality of physical pages. The logical pages are defined by dividing a logical address space by a predetermined size. Each of the physical pages functions to physically retain data of the predetermined size and degrades in storage performance each time an access is made thereto. The memory management apparatus includes: an access frequency index storage unit operable to store an access frequency index for each logical page, the access frequency index indicating an occurrence frequency of an access request specifying a logical address included in a corresponding logical page; a degradation index storage unit operable to store a degradation index for each physical page, the degradation index indicating a degree of degradation in storage performance of a corresponding physical page; and a degradation leveling unit operable to (i) exchange retained data between a first physical page and a second physical page, the first physical page being mapped according to the mapping information to a specific logical page of which an access frequency index is greater than or equal to a first threshold, and the second physical page having a degradation index that is less than or equal to a second threshold, and (ii) update the mapping information so as to show that the specific logical page is mapped to the second physical page.

Here, each physical page may be implemented by a ferroelectric random access memory.

With the above-stated structures, the data contents are exchanged between (i) a physical page that is mapped to a relatively frequently accessed logical page and thus has been degraded to a greater extent and (ii) a physical page that has been degraded comparatively less. Subsequently, the mapping information is updated to be in consistent with the current mapping. Consequently, no specific physical page is intensively degraded and degradation takes place evenly in each physical page.

The memory management apparatus performs the exchange without requiring to collectively erase all the data to secure an empty physical page. Rather, the memory management apparatus exchanges stored data in a valid state. Thus, the memory management apparatus is especially suitable to an FeRAM, which is rewritable at randomly.

Here, the memory management apparatus may further include: a cache storage unit operable to store, for each of up to a predetermined number of the physical pages, cache data that is a copy of data retained in a corresponding physical page and that is accessed instead of the original data, and to write, if cache data has been modified as a result of a subsequent access, the modified cache data back to a corresponding physical page; and a degradation index updating unit operable to add a first value to a degradation index of each physical page that retains original data of cache data stored in the cache storage unit, and add a second value to a degradation index of each physical page to which modified cache data has been written back.

With the above-stated structure, the memory management apparatus accesses a physical page via the cache storage means, so that the absolute number of accesses is reduced.

In addition, between two subsequent cache flush operations, each location in a physical page is (i) not accessed at all, (ii) read but not written, or (iii) read and written. This eliminates unlimited accesses to a specific location in a physical page, so that local degradation within one physical page is suppressed.

Further, the memory management apparatus adds to each degradation index, a value that suitably represents a degradation degree resulting from a read or write operation made to a corresponding physical page. That is to say, the degradation index reliably represents the degradation degree of the physical page even if the resulting degradation degrees differ between a read operation and a write operation.

Here, the degradation index updating unit may add, at a time when cache data is invalidated or replaced by data retained in another physical page, a sum of the first value and the second value to a degradation index of a physical page storing original data of the cache data if the cache data has been modified, and add the first value to the degradation index if the cache data has not been modified.

With the above-stated structure, the update of the degradation indexes are performed all at once at the time of invalidating or replacing cache data, which leads to reduce the number of times of updating the degradation indexes.

Here, the memory management apparatus may further include an access frequency index updating unit operable to add the first value to an access frequency index of a logical page that is mapped according to the mapping information to each physical page retaining original data of cache data stored in the cache storage unit, and to add the second value to an access frequency index of a logical page that is mapped according to the mapping information to each physical page to which modified cache data has been written back.

Further, the access frequency index updating unit may add, at a time when cache data is invalidated or replaced by data retained in another physical page, a sum of the first value and the second value to an access frequency index of a logical page that is mapped according to the mapping information to a physical page retaining original data of the cache data if the cache data has been modified, and add the first value to the access frequency index if the cache data has not been modified.

With the above-stated structures, the access frequency indexes reflect time-varying changes in the access frequencies of logical pages, so that a logical page that is recently accessed more often comes to have a greater access frequency index. Consequently, the frequently accessed logical page is mapped to a less degraded physical page. Thus, these structures are especially suitable to the case where the time-varying changes in the access frequencies need to be taken into account for equalizing degradation of each physical page.

Here, the cache data storage unit may further store, at a time of storing cache data, a cache access frequency index for the cache data, an initial value of the cache access frequency index being set to "0". The memory management apparatus may further include: a cache access frequency index updating unit operable to increment a cache access frequency index of cache data in response to an access to the cache data; and an access frequency index updating unit operable to compare, for each piece of cache data, (i) an access frequency index of a logical page that is mapped according to the mapping information to a physical page retaining original data of a corresponding piece of cache data and (ii) a cache access frequency index of the corresponding piece of cache data, and to update the access frequency index with the cache access frequency index if the cache access frequency index is greater than the access frequency index.

Further, the access frequency index updating unit may perform the update at predetermined time intervals and reset all the cache access frequency indexes to "0".

With the above-stated structures, the memory management apparatus holds a peak value of the access frequencies of each logical page, so that a logical page once recorded a high peak value is mapped to a less degraded physical page always thereafter.

These structures are especially suitable to the case where a specific logical page is accessed intensively in a long term because such a frequently accessed logical page is mapped to a least degraded physical page in disregard of short-term fluctuations in the access frequencies.

Here, the access frequency index updating unit may calculate, for each piece of cache data, a normalized cache access frequency index by normalizing a cache access frequency index based on a time period during which a corresponding piece of cache data is retained in the cache storage unit, compare the normalized cache access frequency index and an access frequency index of a logical page mapped according to the mapping information to a physical page storing original data of the corresponding piece of cache data, and update the access frequency index with the normalized cache access frequency index if the normalized cache access frequency index is greater than the access frequency index.

With the above-stated structure, even if each peak value of the cache access frequencies is acquired for a piece of cache data that is retained in the cache memory for a different length of time, the peak values are normalized and thus reliably compared with each other.

That is to say, it is no longer necessary to retain each piece of cache data for a fixed time period for the only sake of mutual comparison of the peak values. Consequently, for example, there is no need to perform a process, which will be described in the following embodiments, of invalidating the pieces of cache data all at once. This leads to reduce the absolute number of accesses.

Here, each of the logical pages may have a generic logical address that is included in a corresponding logical page. The memory management apparatus may further include: a detecting unit operable to detect an access request specifying any of the generic logical addresses; a degradation index updating unit operable to increment a degradation index of a physical page mapped according to the mapping information to a logical page that includes a generic logical address specified by an access request detected by the detecting unit; and an access frequency index updating unit operable to increment an access frequency index of the logical page that includes the generic logical address specified by the detected access request.

Further, each generic logical address may be a logical address that is accessed whenever a logical page including a corresponding generic logical address is accessed.

The above-stated structures are compact as the cache storage unit is not provided, yet sufficiently equalize degradation of the physical pages when applied to the case where the absolute number of accesses is relatively small.

In another aspect, the present invention provides a memory management apparatus for accessing a physical page mapped according to mapping information to a logical page that includes a logical address specified by an access request. The mapping information shows a one-to-one mapping between a plurality of logical pages and a plurality of physical pages. The logical pages are defined by dividing a logical address space by a predetermined size. Each of the physical pages functions to physically retain data of the predetermined size and degrades in storage performance each time an access is made thereto. The memory management apparatus includes an access frequency index storage unit operable to store an access frequency index for each logical page, the access frequency index indicating an occurrence frequency of an access request specifying a logical address included in a corresponding logical page; a cache storage unit operable to store cache data for each of up to a predetermined number of the physical pages in association with a replication access frequency index that is a copy of an access frequency index of a logical page mapped according to the mapping information to a corresponding physical page, the cache data being a copy of data retained in the corresponding physical page and that is accessed instead of the original data; and a degradation leveling unit operable, when one of the pieces of cache data needs to be replaced with data retained in a new physical page, to replace cache data associated with a replication access frequency index that is less than or equal to an access frequency index of a logical page mapped according to the mapping information to the new physical page.

Here, the memory management apparatus may further include a replication access frequency index updating unit operable, in response to an access to cache data, to decrement a replication access frequency index associated with the cache data.

Here, each physical page may be implemented by a ferroelectric random access memory.

With the above-stated structures, the memory management apparatus replaces, when necessary, a piece of cache data that is less frequently accessed than data to be newly cached. As a result, each piece of cache data is made to retained in the cache storage unit for a substantially equal length of time. Consequently, accesses to replace cache data are made to each physical page at even frequency, which leads to equalize the resulting degradation of the physical pages.

In yet another aspect, the present invention provides a memory management method for accessing a physical page mapped according to mapping information to a logical page that includes a logical address specified by an access request. The mapping information shows a one-to-one mapping between a plurality of logical pages and a plurality of physical pages. The logical pages are defined by dividing a logical address space by a predetermined size. Each of the physical pages functions to physically retain data of the predetermined size and degrades in storage performance each time an access is made thereto. The memory management method employs (i) an access frequency index indicating, for each logical page, an occurrence frequency of an access request specifying a logical address included in a corresponding logical page and (ii) a degradation index indicating, for each physical page, a degree of degradation in storage performance of a corresponding physical page. The memory management method includes a degradation leveling step of (i) exchanging retained data between a first physical page and a second physical page, the first physical page being mapped according to the mapping information to a specific logical page of which an access frequency index is greater than or equal to a first threshold, and the second physical page having a degradation index that is less than or equal to a second threshold, and (ii) updating the mapping information so as to show that the specific logical page is mapped to the second physical page.

Here, the memory management method may further include: a cache managing step of storing, for each of up to a predetermined number of the physical pages, cache data that is a copy of data retained in a corresponding physical page and that is accessed instead of the original data, and of writing, if cache data has been modified as a result of a subsequent access, the modified cache data back to a corresponding physical page; and a degradation index updating step of adding a first value to a degradation index of each physical page that retains original data of cache data stored in the cache storage step, and adding a second value to a degradation index of each physical page to which modified cache data has been written back.

Here, each logical page may have a generic logical address that is included in a corresponding logical page. The memory management method may further include: a detecting step of detecting an access request specifying any of the generic logical addresses; a degradation index updating step of incrementing a degradation index of a physical page mapped according to the mapping information to a logical page that includes a generic logical address specified by an access request detected in the detecting step; and an access frequency index updating step of incrementing an access frequency index of the logical page that includes the generic logical address specified by the detected access request.

In yet another aspect, the present invention provides a memory management method for accessing a physical page mapped according to mapping information to a logical page that includes a logical address specified by an access request. The mapping information shows a one-to-one mapping between a plurality of logical pages and a plurality of physical pages. The logical pages are defined by dividing a logical address space by a predetermined size. Each of the physical pages functions to physically retain data of the predetermined size and degrades in storage performance each time an access is made thereto. The memory management method employs (i) an access frequency index indicating, for each logical page, an occurrence frequency of an access request specifying a logical address included in a corresponding logical page and (ii) a degradation index indicating, for each physical page, a degree of degradation in storage performance of a corresponding physical page. The memory management method includes: a cache storing step of storing cache data for each of up to a predetermined number of the physical pages in association with a replication access frequency index that is a copy of an access frequency index of a logical page mapped according to the mapping information to a corresponding physical page, the cache data being a copy of data retained in the corresponding physical page and that is accessed instead of the original data; and a degradation leveling step of, when one of the pieces of cache data needs to be replaced with data retained in a new physical page, replacing cache data associated with a replication access frequency index that is less than or equal to an access frequency index of a logical page mapped according to the mapping information to the new physical page.

With the memory management methods stated above, memory management is carried out to achieve the effects similar to the above.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 7 is a PAD showing a physical page swapping process;

FIGS. 11A–11E show the contents of the TLB at the major points of time;

FIGS. 16A–16E show the contents of a TLB at the major points of time;

FIG. 20 shows one example of access frequency indexes stored in a TLB;

DESCRIPTION OF THE PREFERRED EMBODIMENT

EMBODIMENT 1

A memory management apparatus according to an embodiment 1 of the present invention stores mapping information that maps each of a plurality of logical pages to one of a plurality of physical pages that degrades each time an access is made to a corresponding physical page. In response to an access request specifying a logical page, the memory management apparatus accesses a physical page that is mapped according to the mapping information to the specified logical page. The memory management apparatus periodically exchanges the contents between a first physical page mapped to a frequently accessed logical page and a second physical page of which degradation degree is relatively small, and modifies the mapping information so as to map the frequently accessed logical page to the second physical page.

Hereinafter, description is given to the memory management apparatus with reference to FIGS. 1–11.

<Overall Structure>

Figure 1:
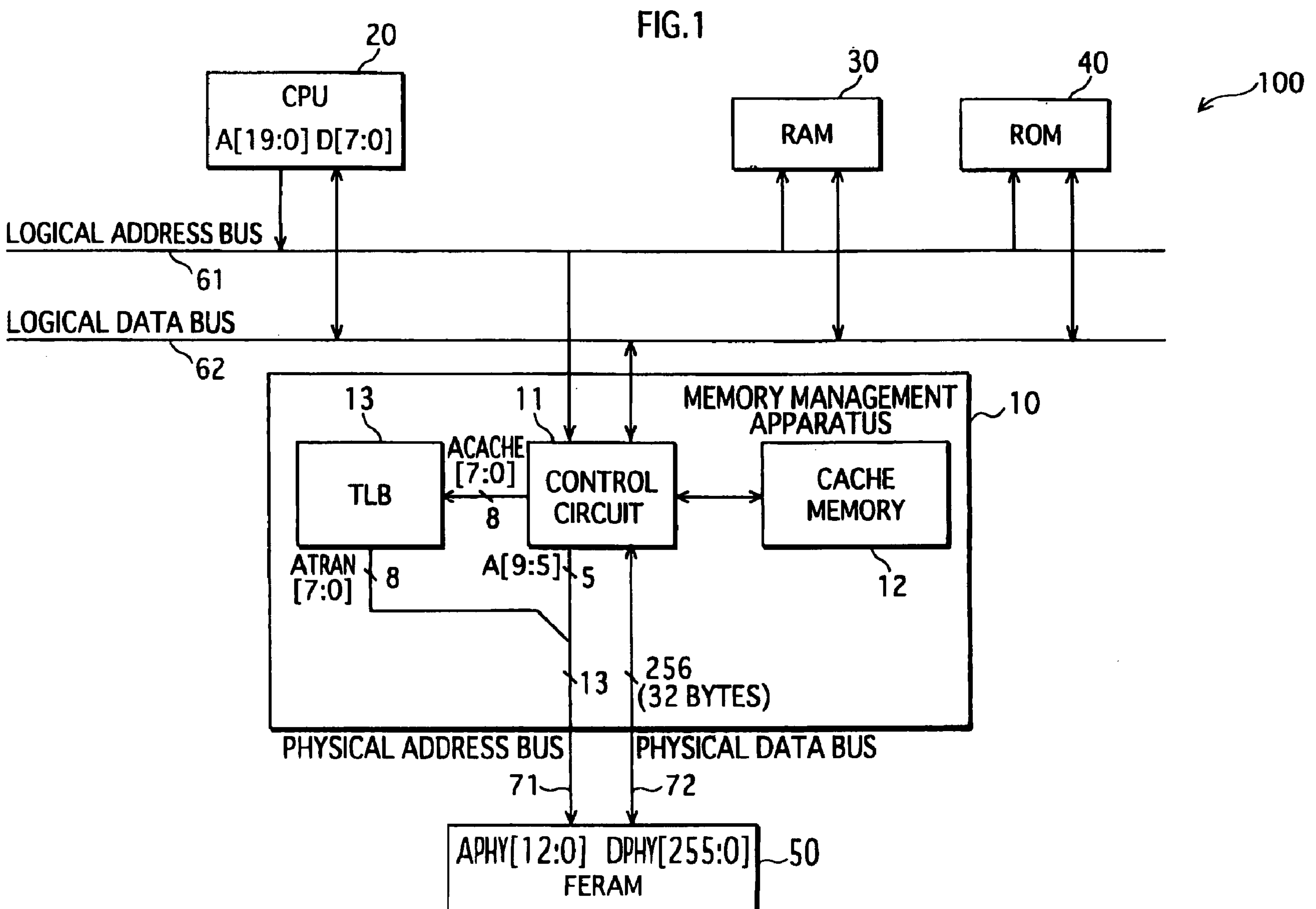
FIG. 1 is a functional block diagram showing the structure of a computer system that includes a memory management apparatus.

FIG. 1 is a functional block diagram showing the structure of a computer system 100 that includes a memory management apparatus 10 according to the embodiment 1.

The computer system 100 is composed of the memory management apparatus 10, a CPU (Central Processing Unit) 20, a RAM (Random Access Memory) 30, a ROM (Read Only Memory) 40, an FeRAM 50, and a logical address bus 61, a logical data bus 62, a physical address bus 71, and a physical data bus 72.

The memory management apparatus 10 is composed of a control circuit 11, a cache memory 12, and a TLB (Translation Lookaside Buffer) 13.

The CPU 20 accesses the memory management apparatus 10, the RAM 30, and the ROM 40 via the logical address bus 61 and the logical data bus 62.

<Logical Page and Physical Page>

Figure 2A:
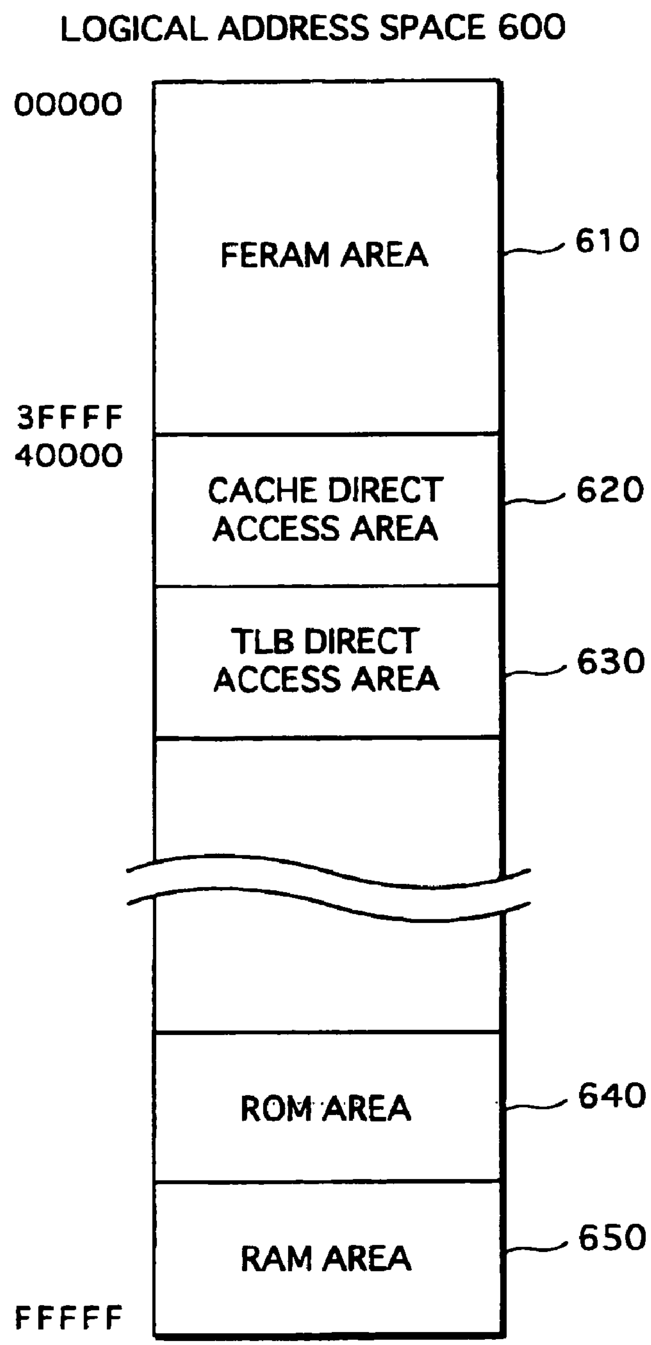
FIG. 2A is an address map illustrating a logical address space of the computer system.

FIG. 2A is an address map illustrating a logical address space of the computer system 100. A logical address space 600 includes an FeRAM area 610, a cache direct access area 620, an TLB direct access area 630, a ROM area 640, and a RAM area 650, and accesses are made to the FeRAM 50, the cache memory 12, the TLB 13, the RAM 30, and the ROM 40 through the respective areas.

Figure 2B:
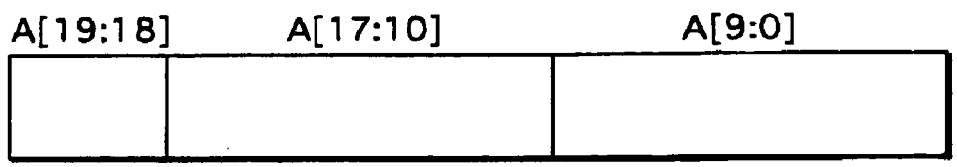
FIG. 2B illustrates one example of the bit structure of a logical address.

FIG. 2B illustrates one example of the bit structure of a logical address that specifies a location in the logical address space 600 in units of bytes. In this example, the logical address is composed of 20 bits. The logical address is outputted to the logical address bus 61 to specify a location to be accessed. When the two most significant bits A [19:18]are "00", the logical address specifies the FeRAM area 610, and the rest of the bits A [17:0] specifies one byte in the FeRAM area 610. The size of the FeRAM area 610 is 256 Kbytes.

Figure 3A:
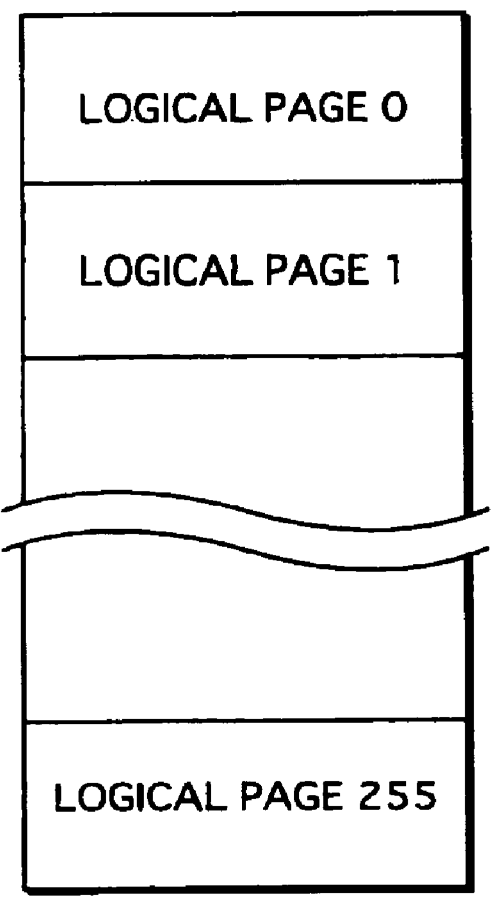
FIG. 3A illustrates the details of an FeRAM area in the logical address space.

FIG. 3A illustrates the details of the FeRAM area 610. The FeRAM area 610 is divided into 256 logical pages, which are the units of memory management. The size of each logical page is 1 Kbyte. The eight middle bits of a logical address A [17:10] specifies one logical page, and the ten least significant bits A[9:0] specifies one byte in the logical page.

Figure 3B:
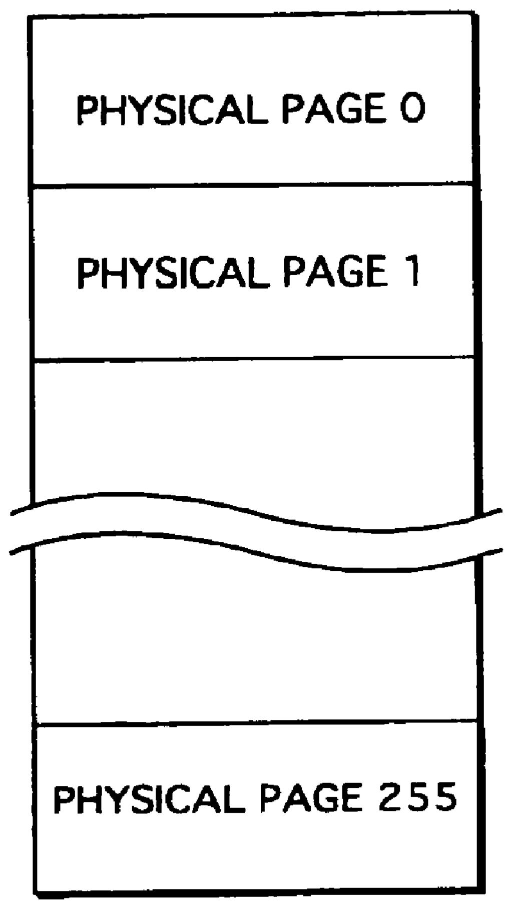
FIG. 3B illustrates the structure of the storage area of an FeRAM.

FIG. 3B illustrates the structure of the storage area of the FeRAM 50. The storage area of the FeRAM 50 is composed of 256 physical pages each capable of retaining 1 Kbyte data. Each physical page is mapped by the memory management apparatus 10 to a different one of the logical pages.

An access to the FeRAM 50 is made in units of 32 bytes, which are the number of bytes retainable in one access unit region that is defined by dividing one physical page into 32 regions.

In response to an access request issued by specifying a logical address, the memory management apparatus 10 caches to the cache memory 12, 32-byte data that includes the targeted one byte in a physical page mapped to the specified logical address, and subsequently accesses the cached data.

<Cache Memory 12>

Figure 4:
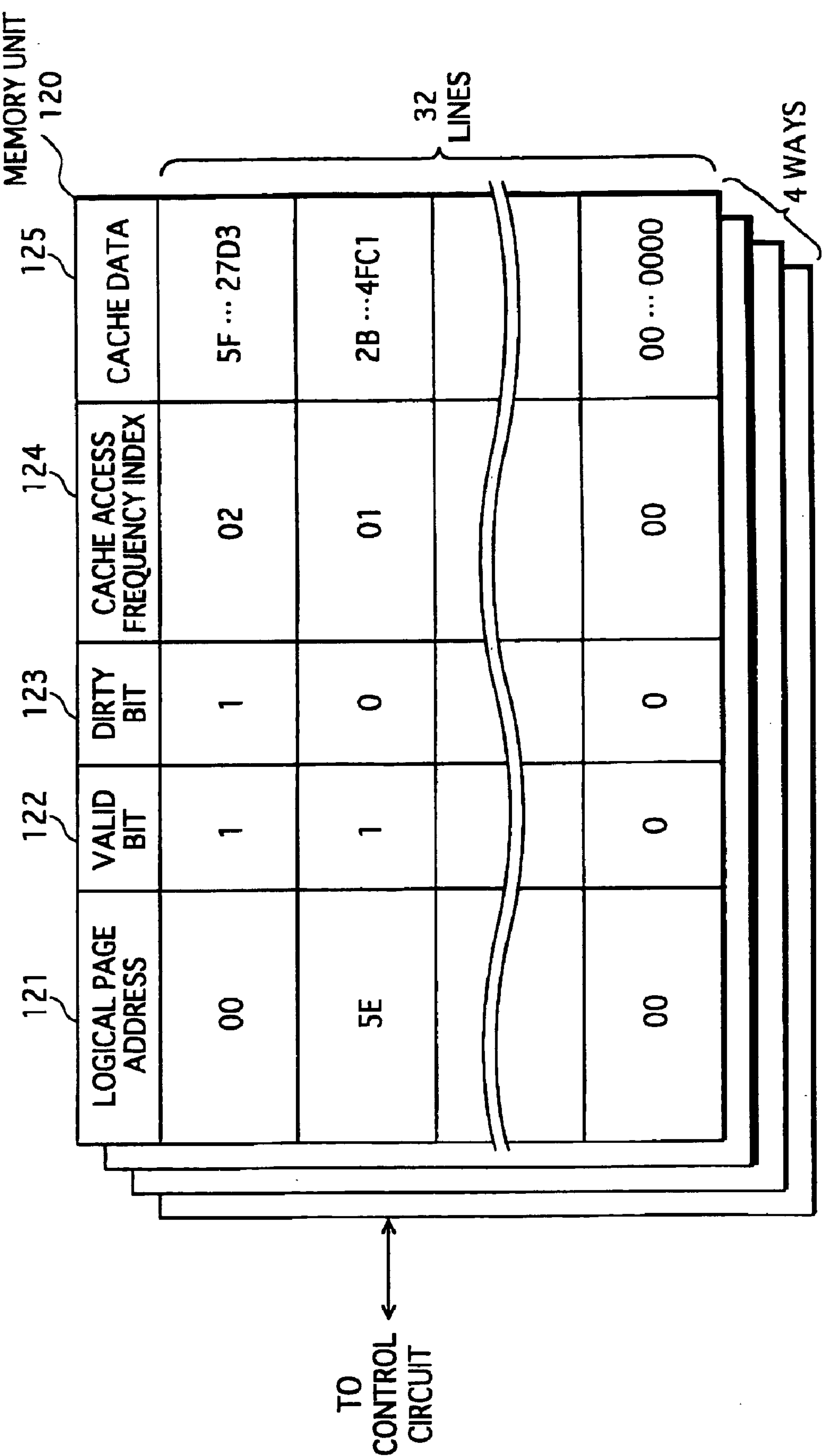
FIG. 4 illustrates the structure of a cache memory.

FIG. 4 illustrates the structure of the cache memory 12. The cache memory 12 is a 4-way set associative cache. The figure shows the structure of the memory unit 120 for one of the ways only, yet a memory having a similar structure is provided for each of the other ways.

The memory unit 120 has a logical page address column 121, a valid bit column 122, a dirty bit column 123, a cache access frequency index column 124, and a cache data column 125.

The cache data column 125 is composed of 32 lines each of which corresponds to a different one of the access unit regions and stores cache data that is a copy of data retained in an access unit region into a corresponding cache line. For each piece of cache data, the logical page address column 121 stores a logical page address that is to be specified when accessing the cache data. The valid bit column 122 stores information showing whether the cache data is valid or not. The dirty bit column 123 stores information showing whether the cache data has been modified from its initial contents. The cache access frequency index column 124 stores an index indicating the frequency of accesses made to the cache data.

Now, description is given in detail to operations for storing cache data. In response to an access request specifying a location in the FeRAM area, the memory management apparatus 10 selects a line specified by the logical address bits A [9:5]. The memory management apparatus 10 then stores the logical address bits A [17:10] to a corresponding line in the logical page address column 121, and also stores a copy of original data to the corresponding line in the cache data column 125. Here, the original data from which the copy is made is 32-byte data retained in a physical page mapped to a logical page specified by the logical address bits A [17:10] in an access unit region that is specified by the logical address bit A [9:5].

Subsequently, the memory management apparatus 10 modifies the selected line in the valid bit column 122, the dirty bit column 123, and the cache access frequency index column 124 to "1", "0", and "0", respectively.

The thus stored cache data is accessed instead of the original data, and written back to the access unit region if modified as a result of the access.

In addition, each time the cache data is accessed, the value stored in the cache access frequency index column 124 is incremented by "1".

Note that general techniques (such as hit, miss, and write-back) used to access the cache memory 12 are of conventionally known techniques, and thus description thereof is not given any further.

<TLB 13>

Figure 5:
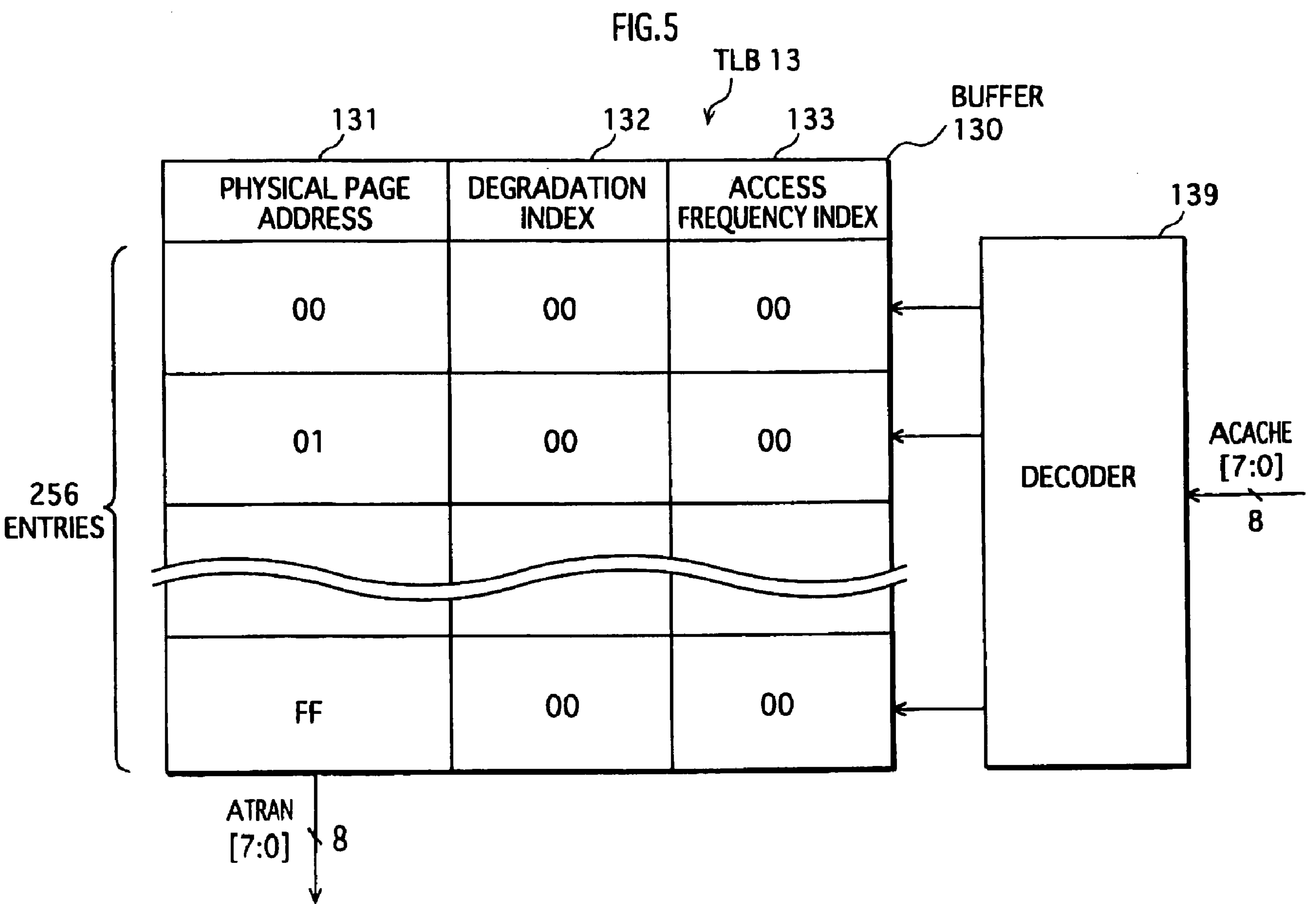
FIG. 5 illustrates the structure of a TLB.

FIG. 5 illustrates the structure of the TLB 13. The TLB 13 is composed of a buffer 130 and a decoder 139.

The buffer 130 has a physical page address column 131, a degradation index column 132, and an access frequency index column 133, and stores 256 entries correspondingly to logical pages.

For each entry, the physical page address column 131 holds a physical page address that specifies a physical page mapped to a corresponding logical page. The degradation index column 132 holds a degradation index that indicates the degradation degree of the physical page. The access frequency index column 133 holds an access frequency index that indicates the occurrence frequency of an access request specifying the logical page.

Values that the degradation index and the access frequency index take are described later in detail.

The decoder 139 is supplied a logical page address A CACHE [7:0] from the control circuit 11, and decodes the logical page address A CACHE [7:0], thereby outputting a selection signal for selecting one entry.

The logical page address A CACHE [7:0] is supplied when the FeRAM needs to be actually accessed. To be specific, the logical page address A CACHE [7:0] is a logical page address relating to an access unit region that is to be read from the FeRAM 50 in a case of a cache miss or to an access unit region to which data is to be written back in a case of a write-back to the FeRAM 50.

The buffer 130 outputs the physical page address A TRAN [7:0] held in the entry that is selected according to the selection signal to the eight most significant bits A PHY [12:5] of the physical address bus 71. That is to say, a logical page number is converted to a physical page number held in the entry that is specified by the logical page number. Through this address conversion operation, a physical page mapped to a desired logical page is to be actually accessed.

At the same time, the control circuit 11 outputs the five middle bits A [9:5] to the five least significant bits A PHY [4:0] of the physical address.

As a result, 32-byte data stored in the FeRAM 50 at a location specified by the physical address A PHY [12:0] is accessed.

<Processes Performed by Memory Management Apparatus 10>

Next, description is given to two distinguishing process of the present invention performed by the memory management apparatus 10.

These processes may be performed by a hardware circuit constituting the control circuit 11, by the control circuit 11 operating according to a program stored in the ROM 40, or by the control circuit 11 operating under the instructions issued from the CPU 20 according to a program stored in the ROM 40.

Further, arrays and variables mentioned in the following description of the processes are practically implemented by the RAM 30 or a register that is included in the control circuit 11.

<Cache Flush and TLB Update Process>

The cache flush and TLB update process invalidates (flushes) all the cache data in the cache memory 12, and if any piece of the cache data has been modified from its initial contents, writes (write-back) the piece of cache data back to the FeRAM 50. Further, the cache flush and TLB update process is updates the TLB 13, so that a peak value of the cache access frequency indexes is stored as an access frequency index of a corresponding logical page, and that the degradation indexes are incremented based on whether an access to a corresponding physical page is made and whether the access is a write access or a read access.

The above process is invoked and performed in response to an interrupt issued by a timer circuit (not illustrated) at regular time intervals. Hereinafter, description thereof is given in detail.

Figure 6:
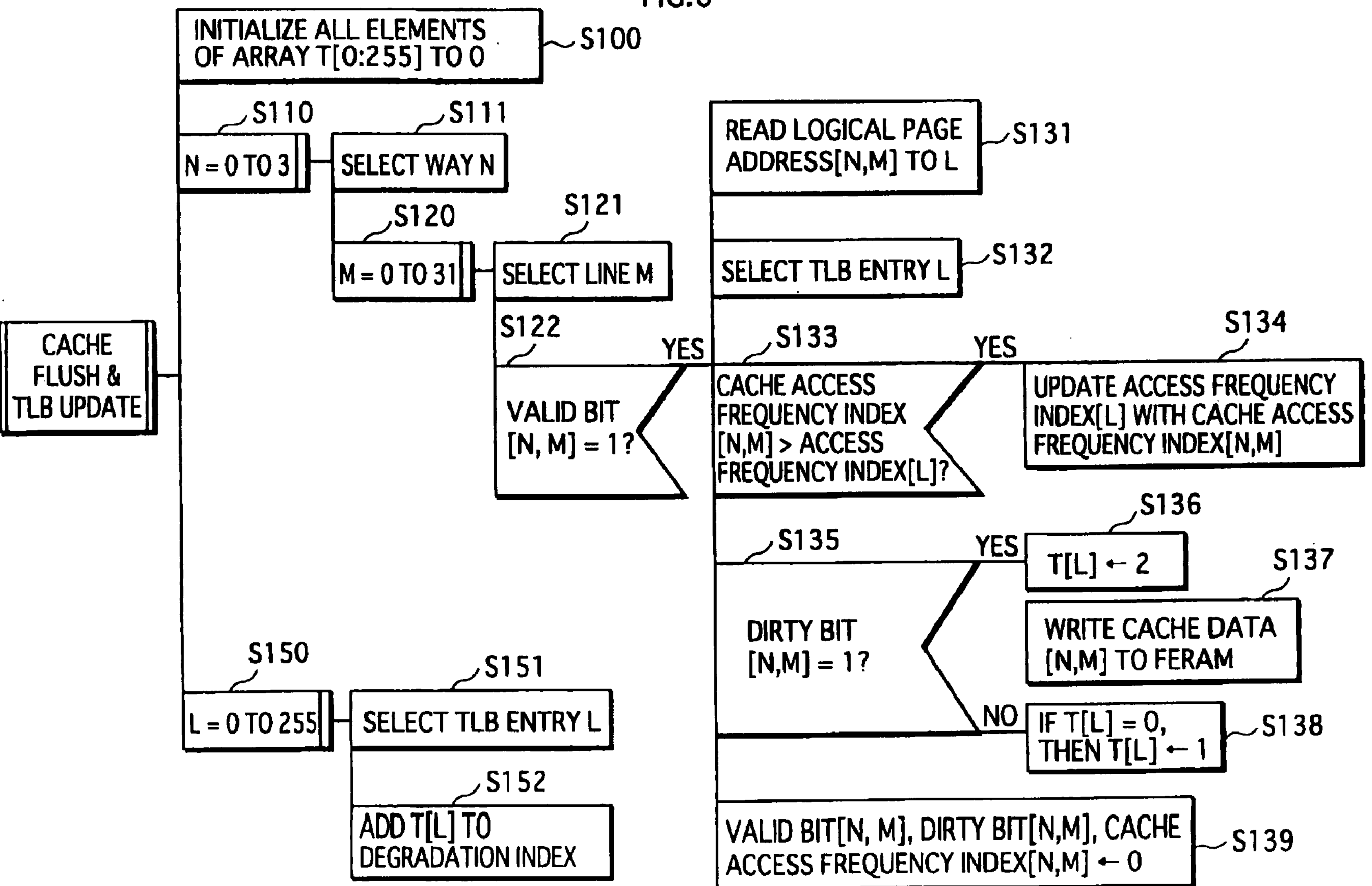
FIG. 6 is a PAD showing a cache flush and TLB update process.

FIG. 6 is a PAD (Program Algorithm Diagram) showing the cache flush and TLB update process. The process is performed using an array T [0:255] and variables N, M, and L. Here, the array T [0:255] shows the degradation degrees of physical pages, the variable N is a parameter specifying a way, the variable M is a parameter specifying a line, and the variable L is a parameter specifying a logical page.

The control circuit 11 first initializes all the elements of the array T to “0” (S100), and then performs steps up to S139 for each way N (S110–S111) and each line M (S120–S121).

If the valid bit [N, M] is “1” (S122: YES), the control circuit 11 assigns the logical address [N, M] to the variable L, and selects an entry [L] of the TLB 13.

If the cache access frequency index is greater than the access frequency index, the control circuit 11 updates the access frequency index with the cache access frequency index (S133–S134).

Through the above steps, each access frequency index in the TLB 13 is updated at the time intervals so as to hold a peak value among the access frequencies of each piece of cache data relating to a corresponding logical page.

Successively, if the dirty bit [N, M] is “1” (S135: YES), the control circuit 11 modifies the array element T [L] to “2” and writes the cache data [N, M] back to the FeRAM 50 (S136–S137). On the other hand, if the dirty bit [N, M] is not “1” (step S135: NO), the control circuit 11 modifies the array element T [L] to “1” provided that the array element T [L] is “0” (S138).

Through the above steps, the array element T [L] takes on a value “0” in the case where no access is made to the physical page mapped to the logical page, a value “1” in the case where the physical page has been read but no data is written back, and a value “2” in the case where the physical page is read and written.

These values are an example given on the precondition that a physical page degrades by “1” per data read operation or data write operation. Naturally, it is applicable to use different degradation values for a data read operation and a data write operation.

Thereafter, the control circuit 11 resets the valid bit, the dirty bit, and the cache access frequency index all to “0” (S139).

Finally, the control circuit 11 adds each logical page’s T [L] to the degradation index of the physical page mapped to the logical page (S150–S152).

<Physical Page Swapping Process>

The physical page swapping process is to exchange data contents between a first physical page that is mapped to a physical page having a maximum access frequency index and a second physical page having a minimum degradation index, and to update information stored in the TLB so to maintain the consistency.

This physical page swapping process is performed successively to the cache flush and TLB update process described above. Detailed description is given below.

FIG. 7 is a PAD showing the physical page swapping process.

The control circuit 11 first retrieves, from the TLB 13, an entry ILMAX holding the maximum access frequency index LMAX and an entry IPMIN holding a minimum degradation index PMIN (S200).

The control circuit 11 then exchanges physical pages shown by the two entries through the following steps (S210–S214).

First, the control circuit 11 reads the contents of a physical page specified by the physical page address held in the entry ILMAX, and stores the read contents to the RAM 30.

The control circuit 11 then transfers the contents of a physical page specified by the physical page address held in the entry IPMIN to the physical page specified by the physical page address held in the entry ILMAX.

Further, the control circuit 11 exchanges the physical page addresses held in the two entries, adds “2” to the degradation index held in each entry and then exchanges the degradation indexes. The reason for adding the value “2” is because, as described above, it is a sum of the degradation values that the physical page receives: “1” as a result a data read and “1” as a result of a data write-back.

SPECIFIC EXAMPLE

Now, description is given using a specific example to show that the resulting degradation of the physical pages in the FeRAM 50 are made substantially even by the memory management apparatus 10 performing the above processes.

In this example, the following three sets of operations are repeated for two times: (i) Regular Operation: Operation by the memory management apparatus 10 for responding to an access request to the FeRAM 50 via the cache memory 12, (ii) Cache Flush Operation: Operation by the memory management apparatus 10 for performing the cache flush and TLB update process described above, and (iii) Physical Page Swapping Operation: Operation by the memory management apparatus 10 for performing the physical page swapping process described above.

Figure 8:
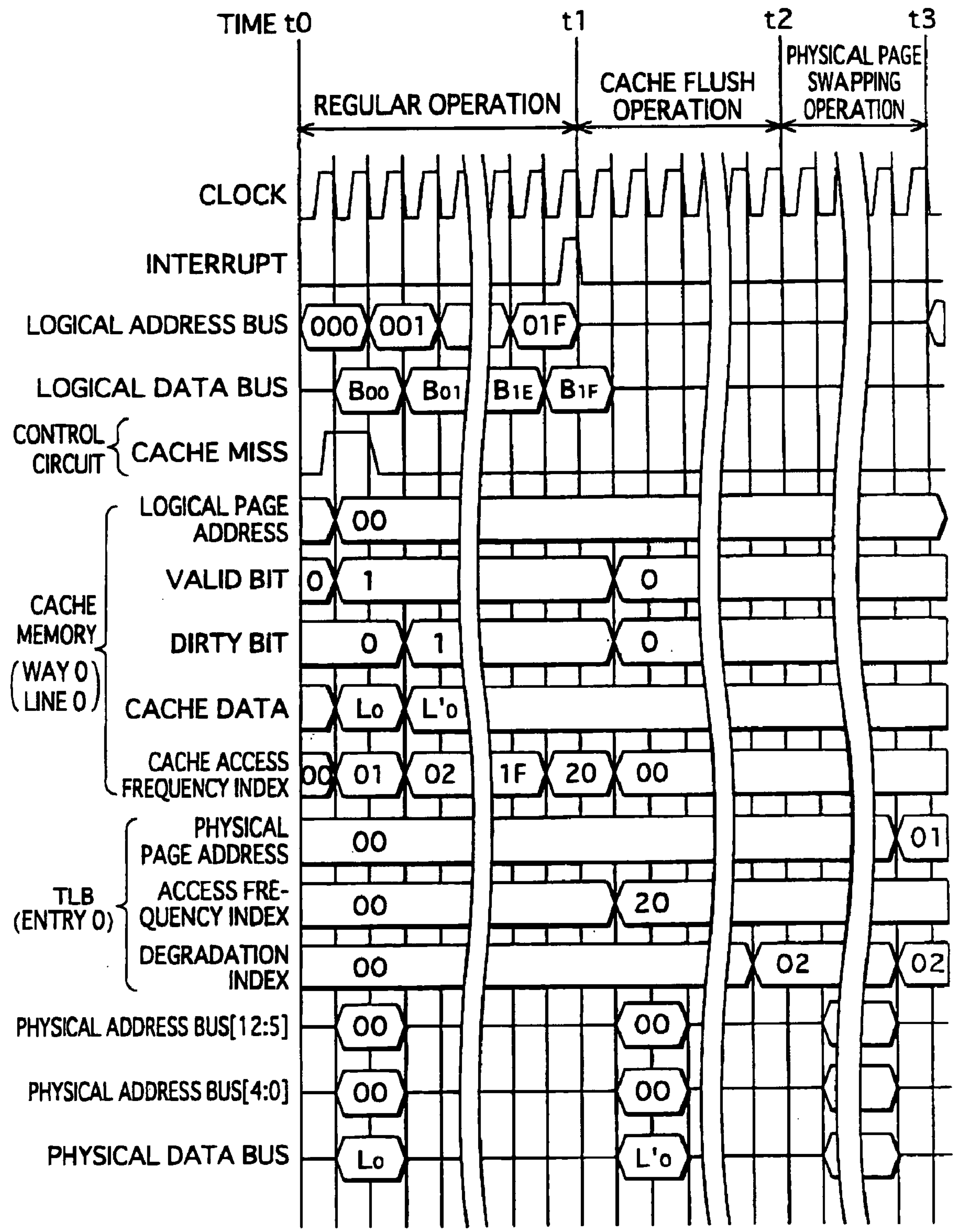
FIG. 8 is a timing chart showing time-varying changes in data and signals.
Figure 9:
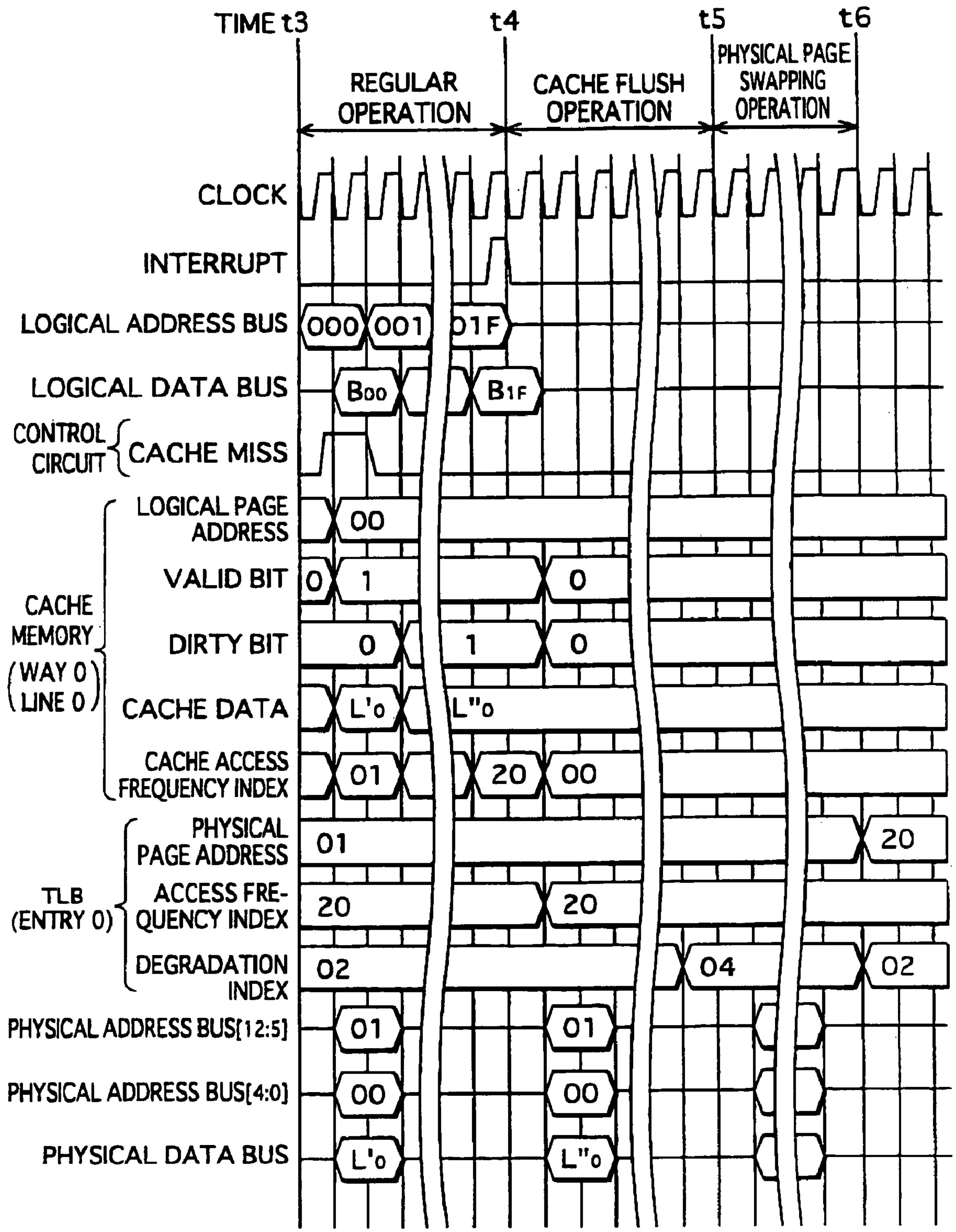
FIG. 9 is a timing chart showing time-varying changes in the data and signals.

FIGS. 8 and 9 are timing charts showing time-varying changes in data and signals in each component of the computer system 100 FIG. 8 shows the first of the two iterations and FIG. 9 shows the second.

FIGS. 10A–10E show cumulative access counts to locations of the FeRAM 50 at major points of time.

FIGS. 11A–11E show the contents of the TLB 13 at the major points of time.

Hereinafter, description is given in time sequence with reference to related parts of the figures.

(Time t0–t1) Regular Operation for First Iteration

Figures 10A, 10B, 10C, 10D, 10E:
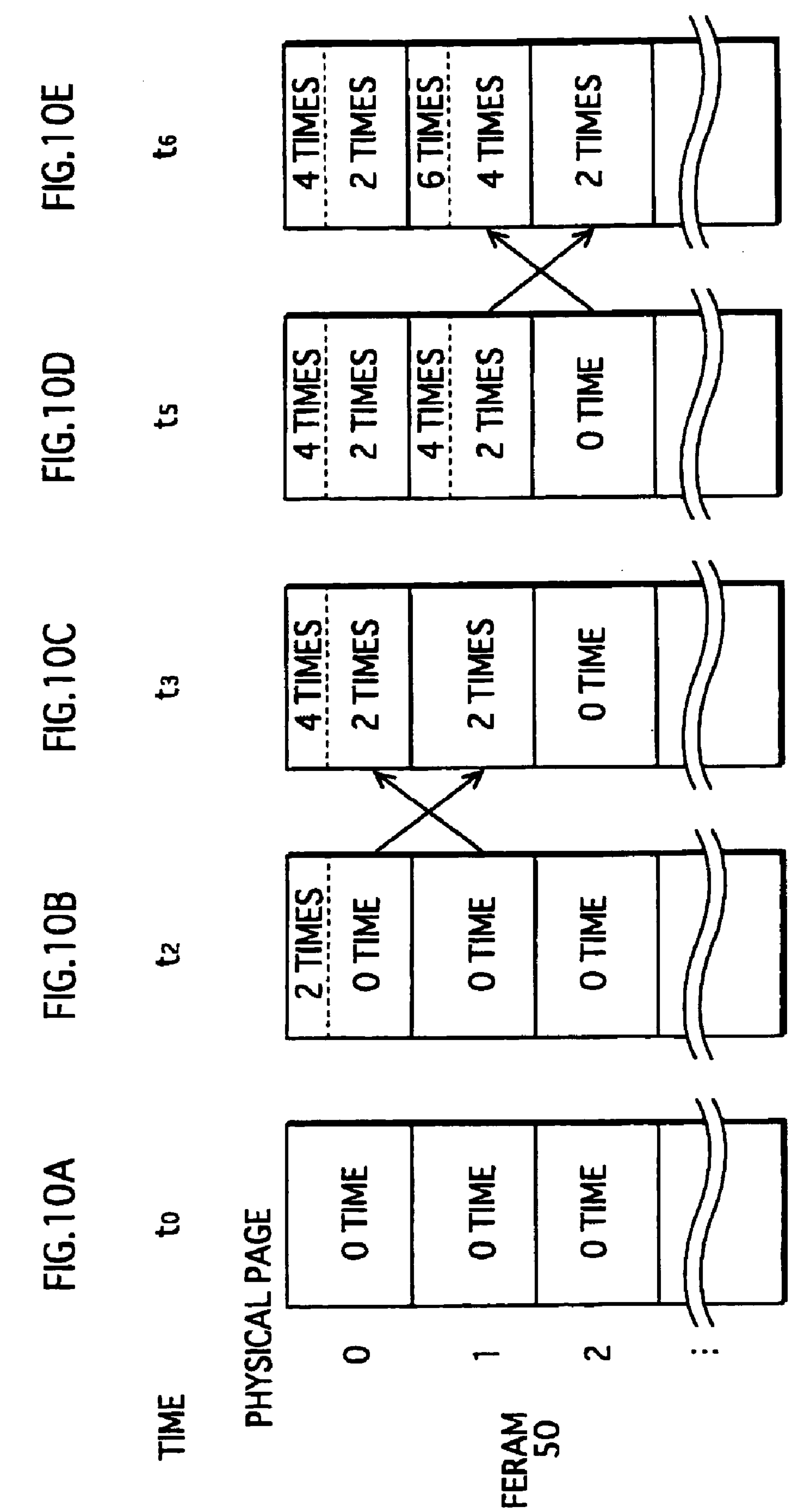
FIGS. 10A–10E show cumulative access counts to locations of the FeRAM at major points of time.

At the time t0, as shown in FIG. 10A, no access has been made to any location of the FeRAM 50, and as shown in FIG. 11A, each of the logical pages is mapped to a physical page having the same address as a corresponding logical page, and the degradation indexes and the access frequency indexes are all set to "0".

With this state, as shown in FIG. 8, access requests specifying logical addresses 000x–01Fx (which correspond to 32-byte data in the access unit region at the top of the logical page 0) are sequentially issued to the logical address bus. Here, each of the access requests is processed in two cycles. In the first cycle, judgment as to a cache hit/miss is made. When the access request is judged to be a cache miss, cache data is acquired from the FeRAM to the cache memory, and in the second cycle that follows, the access request is processed using the thus acquired cache data.

As a result that the first access request is judged to be a cache miss, the physical address 00x held in the TLB entry 0, which corresponds to the logical page 0, is outputted to the physical address bus [12:5], and the logical address [9:5] is outputted to the physical address bus [4:0]. Consequently, the FeRAM 50 outputs 32-byte data L0 retained in the access unit region at the top of the physical page 00x to the physical data bus. The thus outputted data L0 is stored as cache data to Line 0 of Way 0.

According to each of the subsequent accesses, the thus stored cache data is accessed, so that the cache access frequency index held in Way 0-Line 0 increases to 20x. Here, description is given provided that the subsequent accesses include a write access and thus the dirty bit is set to "1".

(Time t1–t2) Cache Flush Operation for First Iteration

In the cycle t1-1, an interrupt signal is issued, so that the memory management apparatus 10 starts the cache flush operation at the time t1.

The cache flush operation is just as described in detail in the Cache Flush and TLB Updating Process section above.

To add description regarding this specific example, since the valid bit in Way 0-Line 0 of the cache memory is set to "1", the cache access frequency index "20x" is compared with the access frequency index "00x" held in the TLB entry 0, which corresponds to the logical page 0. As a result of the comparison, the access frequency index is updated to "20x".

Further, since the dirty bit is set to "1", the array element T [0] (not illustrated in FIG. 8) is modified to "2", and the modified cache data L'0 is written back to the physical page 0. In addition, the degradation index of the TLB entry 0 is updated to "2".

As a result, at the point of time t2, as shown in FIG. 10B, the cumulative access count of the access unit region at the top of the physical page 0 of the FeRAM 50 becomes "2", and as shown in FIG. 11B, the degradation index and the access frequency index both of the TLB entry 0 become "2" and "20x", respectively.

(Time t2–t3) Physical Page Swapping Operation for First Iteration

The memory management apparatus performs, after the time t2 following the cache flush operation, the physical page swapping operation for the first iteration.

This operation is just as described in the Physical Page Swapping operation Process section above.

To add description regarding this specific example, the TLB is searched for the entry 0, which holds the maximum access frequency index "20x", and the entry 1, which holds the minimum degradation index "0". In the case where there are more than one entries holding the minimum degradation index, the smallest number entry is retrieved.

Next, the contents are exchanged between the physical page 0 and the physical page 1, which are shown by the entries 1 and 2, respectively.

Then, the physical page addresses are exchanged between the entry 0 and the entry 1. In addition, the value "2" is added to the degradation index of each entry, and then the two degradation indexes are exchanged with each other.

As a result, as shown in FIG. 10C, at the point of the time t3, the cumulative access count of the access unit region at the top of the physical page 0 in the FeRAM 50 becomes "4", the cumulative access count of the rest of the physical page 0 becomes "2", and the cumulative access count of the physical page 1 becomes "2". Also at the point of the time t3, as shown in FIG. 11C, the degradation index and the access frequency index in the TLB entry 0 become "1" and "2", respectively, and the physical page address and the degradation index in the TLB entry 1 become "0" and "4", respectively.

As apparent from the foregoing, each degradation index shows the degradation degree of the most severely degraded location in a physical page.

(Time t3–t4) Regular Operation for Second Iteration

The memory management apparatus performs, following the physical page swapping operation, the regular operation after the time t3 for the second iteration.

As shown in FIG. 9, access requests again specifying logical addresses 000x–01Fx are sequentially issued to the logical address bus. These access requests include a write access request.

As a result, similarly to the first regular operation, the cache access frequency of Way 0-Line 0 increases to "20x" and the dirty bit is set to "1".

(Time t4–t5) Cache Flush Operation for Second Iteration

In the cycle t4-1, an interrupt signal is issued, so that the memory management apparatus 10 starts the cache flush operation for the second iteration at the time t4.

Through this operation, the cache access frequency index "20x" held in Way 0-Line 0 of the cache memory is compared with the access frequency index "20x" held in the TLB entry 0, which corresponds to the logical page 0. As a result of the comparison, the access frequency index "20x" is maintained as it is.

Further, the array element T [0] (not illustrated in FIG. 9) is modified to "2", and the modified cached at a L"0 is written back to the physical page 1. In addition, T [0] is added to the degradation index of the TLB entry 0, which results in "4".

As a result, at the point of time t5, the cumulative access count of the access unit region at the top of the physical page 0 in the FeRAM 50 becomes “4” as shown in FIG. 10D, and the degradation index of the TLB entry 0 becomes “4” as shown in FIG. 11D.

(Time t5–t6) Physical Page Swapping Operation for Second Iteration

The memory management apparatus performs the physical page swapping operation after the time t5 for the second iteration.

Through this operation, the TLB is searched for the entry 0, which holds the maximum access frequency index “20x”, and the entry 2, which holds the minimum degradation index “0”.

Next, the contents are exchanged between the physical page 1 and the physical page 2, which are shown by the entry 0 and entry 2, respectively. The physical page addresses are also exchanged between the entry 0 and the entry 2. In addition, the value “2” is added to the degradation index of each entry, and then the two degradation indexes are exchanged with each other.

As a result, at the point of time t6, as shown in FIG. 10E, the cumulative access count of the access unit region at the top of the physical page 1 in the FeRAM 50 becomes “6”, the cumulative access count of the rest of the physical page 1 becomes “4”, and the cumulative access count of the physical page 2 becomes “2”. Also at the point of time t6, as shown in FIG. 11E, the degradation index and the access frequency index in the TLB entry 0 become “2” and “2”, respectively, and the physical page address and the degradation index in the TLB entry 2 become “1” and “6”, respectively.

<Conclusion>

As described above, according to the memory management apparatus of the embodiment 1, each access frequency index represents the access frequency of a corresponding logical page, while each degradation index represents the degradation degree of a corresponding physical page. The memory management apparatus exchanges the contents between a physical page that is mapped to a logical page having a largest access frequency index and a physical page having a smallest degradation index, and subsequently modifies the mapping between the related logical pages and physical pages accordingly.

That is to say, a physical page that degrades significantly because the physical page has been mapped to a frequently accessed logical page is newly mapped to a less frequently accessed logical page. In addition, the frequently accessed logical page is newly mapped to a least degraded physical page. This operation is performed periodically, so that it is avoided that one or more physical pages degrade significantly relative to the other physical pages.

Especially to be noted is that an access frequency index for each logical page holds a peak value of the access frequencies. Thus, once a logical page records a high peak value, the memory management apparatus maps a least degraded physical page to the logical page at all times thereafter.

The structure stated above is preferable to the case where one or more specific logical pages are accessed intensively in a long term. This is because the memory management apparatus with this structure maps such frequently accessed logical pages to least degraded physical pages in disregard of short-term fluctuations in the access frequencies.

Further, since the memory management apparatus accesses the FeRAM via the cache memory, the absolute number of accesses to the FeRAM is reduced.

In the presence of the cache memory, each access unit region in a physical page, per cache flash operation, is (i) not accessed at all, (ii) read one time, or (iii) read one time and written back one time. This eliminates the possibility of unlimited accesses to a specific access unit region, so that local degradation within one physical page is suppressed.

Note that the technique described in the Related Art section of this specification employs an empty physical block and is especially suitable for flash memory. Unlike the conventional technique, the memory management apparatus according to the present invention carries out the degradation leveling among physical pages by exchanging stored data that remains valid. This feature is especially suitable to memory management for FeRAM, which does not require an entire physical page to be erased all at once for performing physical page swapping and thus accessible at randomly.

EMBODIMENT 2

Similarly to the memory management apparatus described in the embodiment 1, a memory management apparatus according to an embodiment 2 of the present invention is for leveling degradation of physical pages by periodically exchanging the contents between a first physical page that is mapped to a frequently accessed logical page and a least degraded physical page. The memory management apparatus of the embodiment 2 differs from the memory management apparatus of the embodiment 1 in how access frequency indexes indicate the access frequency of each logical page.

<Overall Structure>

The structures of the memory management apparatus according to the embodiment 2 and of a computer system that includes the memory management apparatus is substantially similar to the ones described in the embodiment 1 (see FIG. 1). The only difference lies in that the cache memory does not have a cache access frequency index column. Illustration of the memory management apparatus and the computer system of the embodiment 2 is omitted.

Further, the same description as the embodiment 1 applies to logical pages and physical pages.

<Cache Flush and TLB Update Process>

The memory management apparatus of the embodiment 2 calculates access frequency indexes that are different from those employed in the embodiment 1 by performing the following cache flush and TLB update process.

The cache flush and TLB update process according to the embodiment 2 is to increment, after the cache flush and write-back, both an access frequency index and a degradation index depending on whether an access to a physical page is made and whether the access is a read access or a write access.

Figure 12:
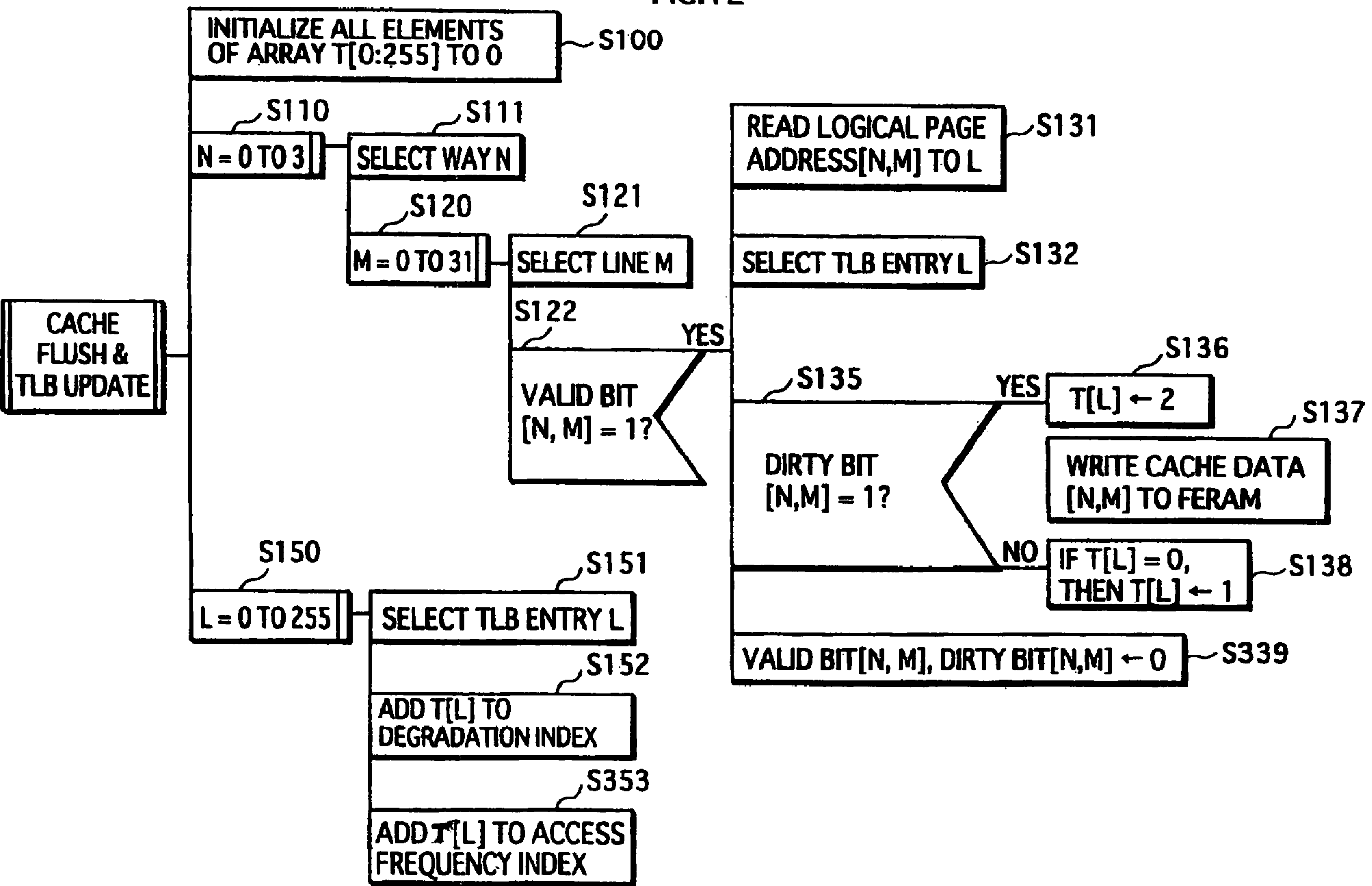
FIG. 12 is a PAD showing a cache flush and TLB update process.

FIG. 12 is a PAD showing this process. Comparing to the cache flush and TLB update process according to the embodiment 1 (see FIG. 6), the steps S133–S134 of updating an access frequency index based on a cache access frequency index are deleted, while a step S353 of adding T to an access frequency index is added. Accordingly, an access frequency index in the embodiment 2 indicates a cumulative access count (i.e., a cumulative amount of degradation having given to the physical page) having been made to a physical page thorough a corresponding logical page.

The other steps remain the same.

Based on the access frequency indexes, the physical page swapping process similar to that of the embodiment 1 is performed.

SPECIFIC EXAMPLES

Now, description is given to a specific example relating to the embodiment 2 on the precondition that access requests similar to those in the embodiment 1 are made.

Figure 13:
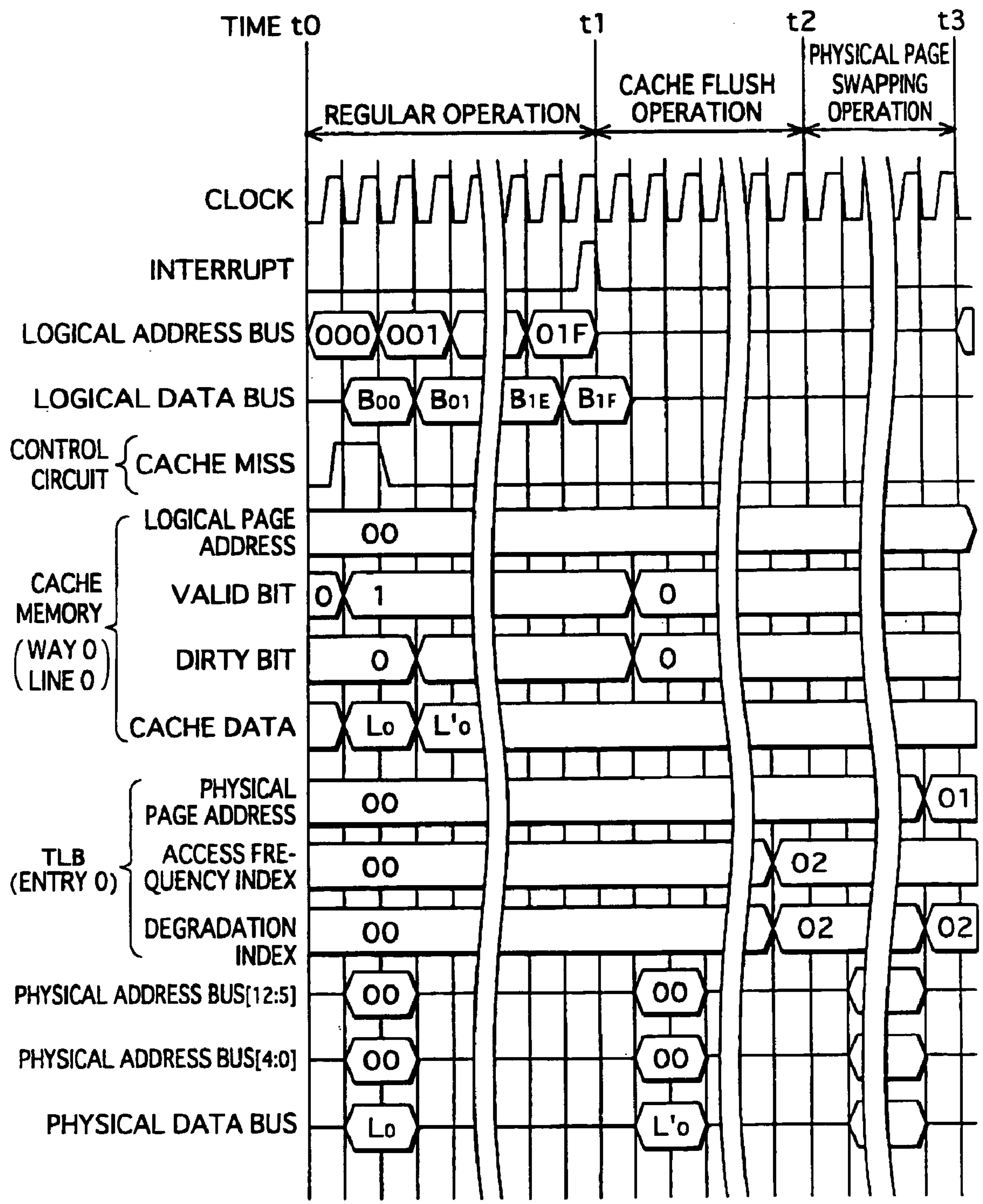
FIG. 13 is a timing chart showing time-varying changes in data and signals.
Figure 14:
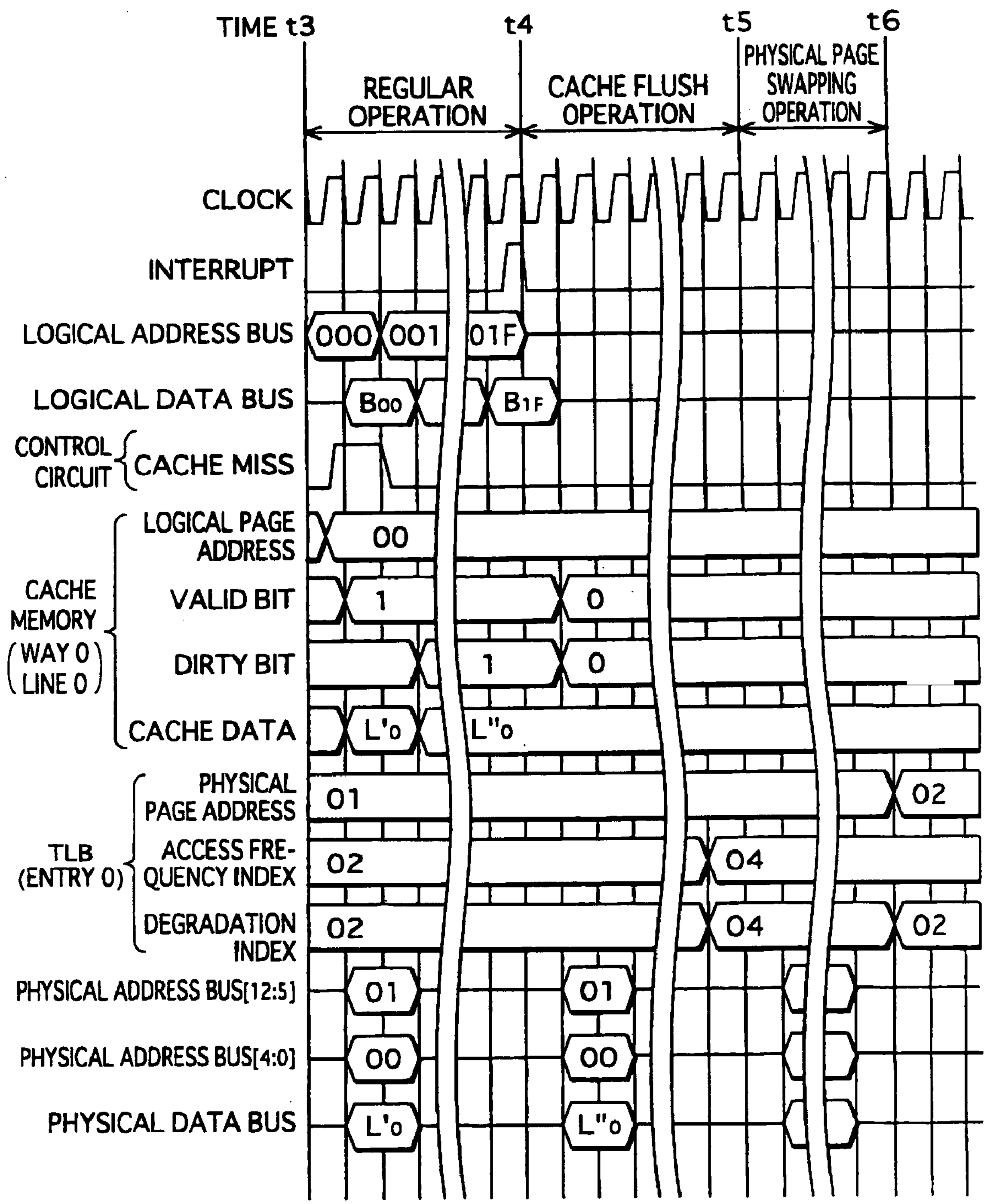
FIG. 14 is a timing chart showing time-varying changes in the data and signals.

FIGS. 13 and 14 are timing charts showing time-varying changes in data and signals in each component of the computer system 100. Note that there is no row showing a cache access frequency index.

FIGS. 15A–15E show cumulative access counts made to locations of the FeRAM 50 at major points of time.

FIGS. 16A–16E show the contents of the TLB 13 at the major points of time.

Hereinafter, description is given in time sequence with reference to related parts of the figures.

(Time t0–t1) Regular Operation for First Iteration

Apart form that no operations for updating a cache access frequency index are performed, the other operations performed herein are similar to those performed in the embodiment 1.

(Time t1–t2) Cache Flush Operation for First Iteration

The access frequency index of the TLB entry 0 is updated to "2" along with the degradation index. The other operations performed herein are similar to those performed in the embodiment 1.

Figures 15A, 15B, 15C, 15D, 15E:
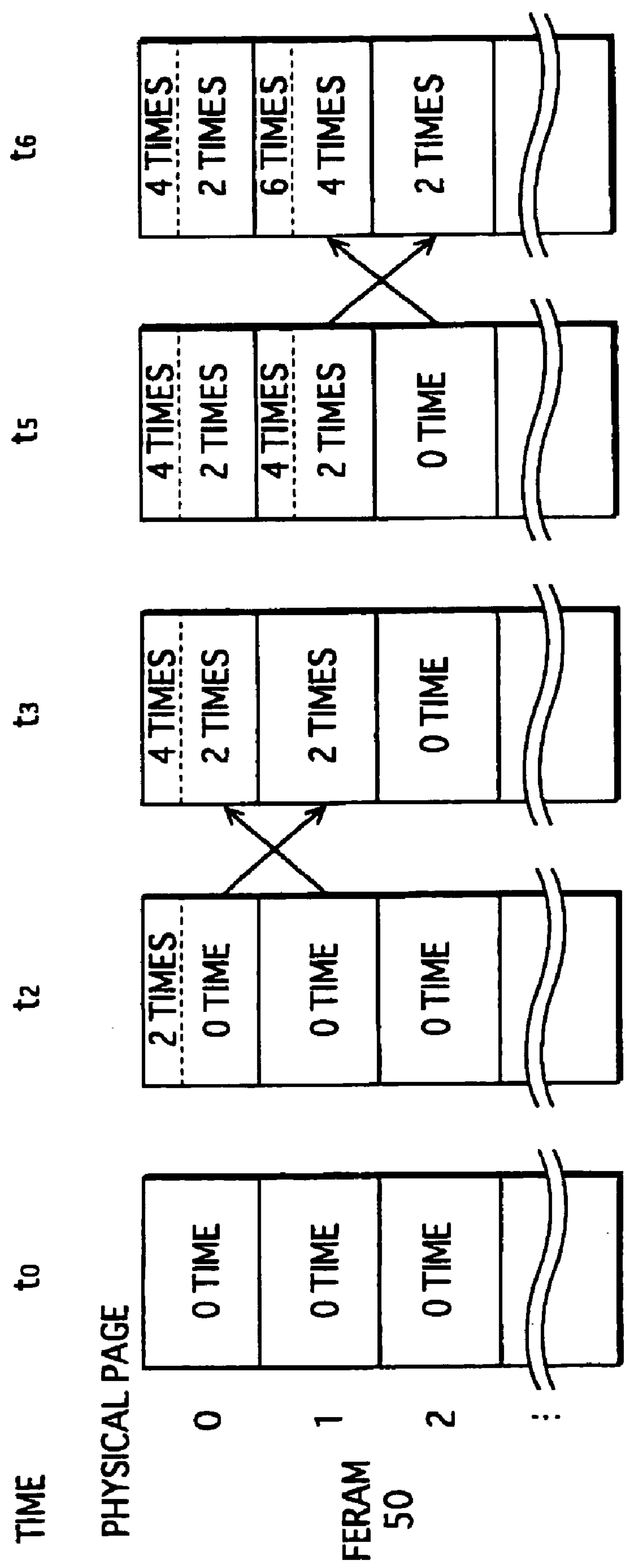
FIGS. 15A–15E show cumulative access counts to locations of an FeRAM at major points of time.

As a result, at the point of time t2, the cumulative access count of the access unit region at the top of the physical page 0 in the FeRAM becomes "2" as shown in FIG. 15B, and as shown in FIG. 16B, the degradation index and the access frequency index both of the TLB entry 0 become "2" and "2", respectively.

(Time t2–t3) Physical Page Swapping Operation for First Iteration

The TLB is searched for an entry 0, which holds the maximum access frequency index "2", and the entry 1, which holds the minimum degradation index "0". Next, the contents are exchanged between the physical page 0 and the physical page 1, which are shown by the respective entries.

Subsequently, the physical page addresses are exchanged between the entry 0 and the entry 1. In addition, the value "2" is added to the degradation index of each entry, and the two degradation indexes are then exchanged with each other.

As a result, at the point of the time t3, the cumulative access counts of each location of the FeRAM and the contents of the TLB are as shown in FIGS. 15C and 16C, respectively.

(Time t3–t4) Regular Operation for Second Iteration

Apart form that no operations for updating a cache access frequency index are performed, the other operations performed herein are similar to those performed in the embodiment 1.

(Time t4–t5) Cache Flush Operation for Second Iteration

The access frequency index and the degradation index held in the TLB entry 0 are both updated to "4". The other operations performed herein are similar to those performed in the embodiment 1.

As a result, at the point of time t5, the cumulative access count of the first 32-byte data of the physical page 0 in the FeRAM 50 becomes "4" as shown in FIG. 15D, and as shown in FIG. 16D, the degradation index and the access frequency index of the TLB entry 0 become "4" and "4", respectively.

(Time t5–t6) Physical Page Swapping Operation for Second Iteration

The TLB is searched for the entry 0, which holds the maximum access frequency index "4", and the entry 2, which holds the minimum degradation index "0". Next, the contents are exchanged between the physical page 1 and the physical page 2, which are shown by the respective entries.

Subsequently, the physical page addresses are exchanged between the entry 0 and the entry 2. In addition, the value "2" is added to the degradation index of each entry, and then the two degradation indexes are exchanged with each other.

As a result, at the point of the time t6, the cumulative access counts at each location of the FeRAM and the contents of the TLB are as shown in FIGS. 15E and 16E, respectively.

<Conclusion>

As described above, according to the memory management apparatus of the embodiment 2, each access frequency index represents a cumulative access count having been made to a physical page through a corresponding logical page. Accordingly, the access frequency of each logical page varies with time, a logical page that has been accessed more frequently than before comes to have a greater access frequency index. Consequently, the frequently accessed logical page is mapped to a least degraded physical page. That is to say, the structure stated above is especially suitable to the case where time-varying changes in access frequencies need to be considered for the physical page degradation leveling.

EMBODIMENT 3

Similarly to the memory management apparatus described in the embodiment 1, a memory management apparatus according to an embodiment 3 of the present invention is for leveling degradation of physical pages by periodically exchanging the contents between a first physical page that is mapped to a frequently accessed logical page and a least degraded physical page.

Intended for use where the absolute number of accesses is relatively small, the memory management apparatus of the embodiment 3 differs from that of the embodiment 1 in that the cache memory is not provided, and thus different access frequency indexes are employed.

Hereinafter, with reference to FIGS. 17–19, description is given to the memory management apparatus mainly to the points unique to the embodiment 3 while the points similar to the embodiment 1 are omitted.

<Overall Structure>

Figure 17:
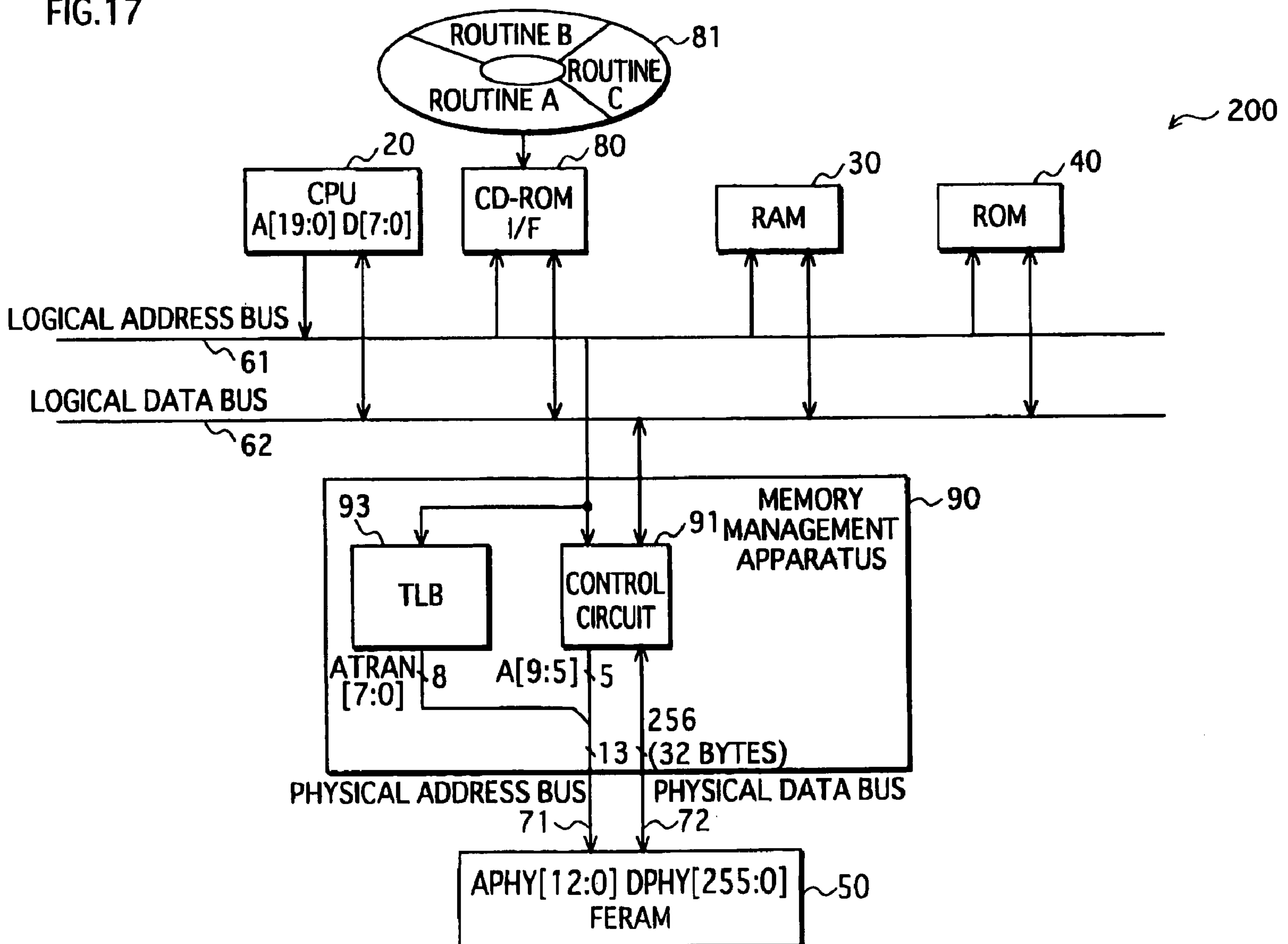
FIG. 17 is a functional block diagram showing the structure of a computer system that includes a memory management apparatus.

FIG 17 is a functional block diagram showing the structure of a computer system 200 that includes a memory management apparatus 90 according to the embodiment 3.

The computer system 200 is composed of the memory management apparatus 90, a CPU 20, a RAM 30, a ROM 40, an FeRAM 50, a logical address bus 61, a logical data bus 62, a physical address bus 71, a physical data bus 72, a CD-ROM I/F (Compact Disk-Read Only Memory InterFace) 80, and a CD-ROM 81.

The memory management apparatus 90 is composed of a control circuit 91 and a TLB 93.

The control circuit 91 is similar to the control circuit 11 of the embodiment 1 except that the control function for cache memory is not provided.

Note that the same reference numerals as the embodiment 1 are used to denote components similar to those mentioned in the embodiment 1 (see FIG. 1), and thus description thereof is omitted.

The computer system 200 is also provided with physical pages and logical pages to which the same description as the embodiment 1 applies.

When the computer system 200 is powered on, the CPU 20 executes a program pre-recorded in the ROM 40, so that a plurality of program routines are loaded from the CD-ROM 81 to the FeRAM 50 via the CD-ROM I/F 80. Thereafter, the CPU 20 executes the loaded program routines, thereby performing a predetermined function The computer system 200 may be a control oriented microcomputer system, a game machine, or a communication apparatus.

<Allocations of Program Routines>

Figure 18:
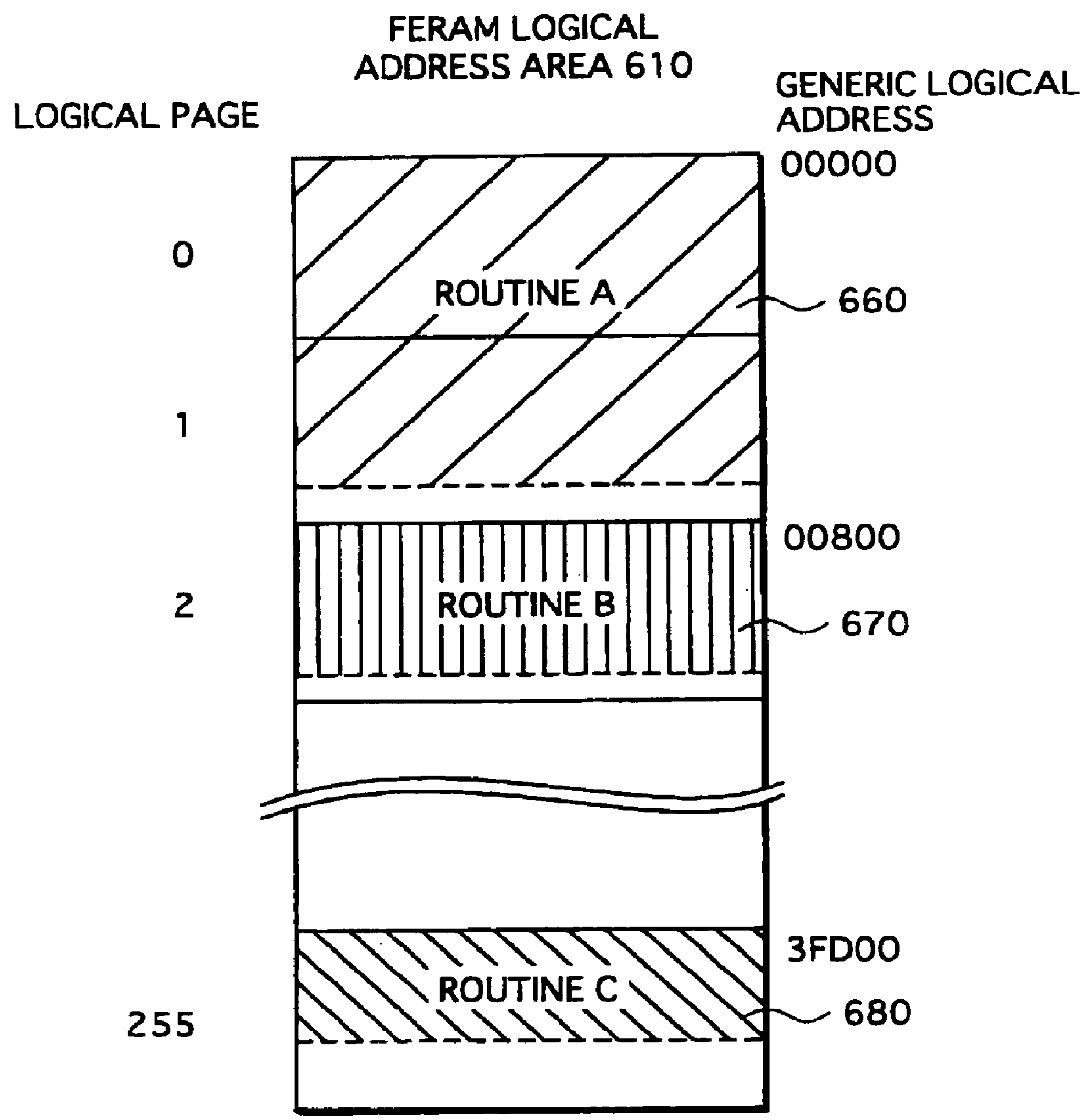
FIG. 18 shows an example of the allocation of program routines in an FeRAM area.

FIG. 18 shows an example of the allocation of program routines in the FeRAM area of the computer system 200. As shown in the figure, each program routine loaded from the CD-ROM 81 is allocated to one or more logical pages.

<TLB 93>

Figure 19:
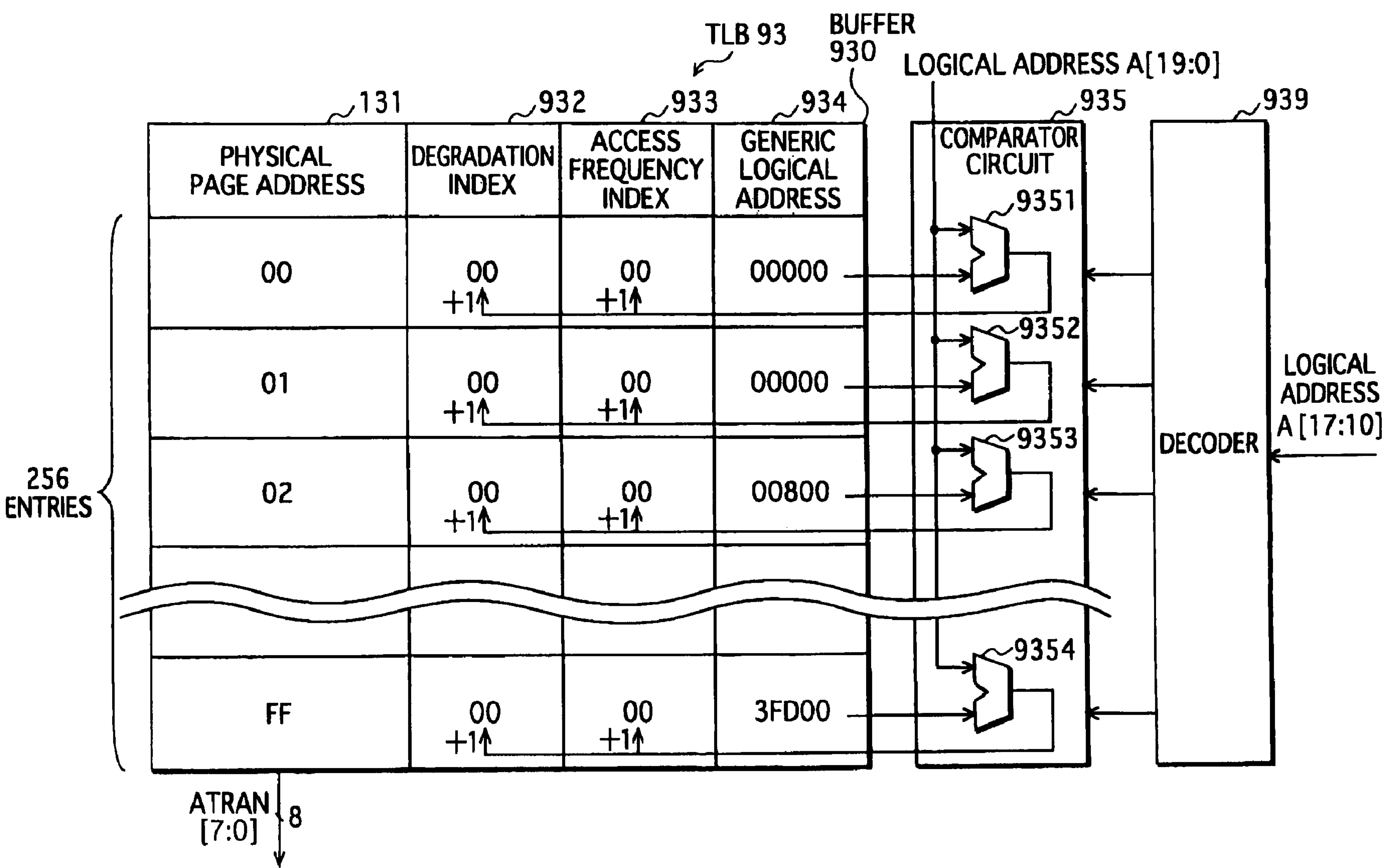
FIG. 19 illustrates the structure of a TLB.

FIG. 19 illustrates the structure of a TLB 93. The TLB 93 is composed of a buffer 930, a comparator circuit 935, and a decoder 939.

The buffer 930 has a physical page address column 131, a degradation index column 932, an access frequency index column 933, and a generic logical address column 934, and stores 256 entries correspondingly to the logical pages.

For each entry, the physical page address column 131 holds a physical page address that is mapped to a corresponding logical page. The degradation index column 932 holds a degradation index that indicates the degree of degradation of the physical page. The access frequency index column 933 holds an access frequency index that indicates the occurrence frequency of an access request specifying the logical page. The generic logical address column 934 holds a generic logical address that represents the logical page.

The decoder 939 acquires a logical address A [17:10] from the logical address bus 61, and decodes the acquired logical address, thereby outputting a selection signal for selecting one entry. The buffer 930 outputs the physical page address A TRAN [7:0] of the entry that is selected according to the selection signal to the eight most significant bits APHY [12:5] of the physical address bus 71. Consequently, the TLB 93 converts the logical page address shown by the logical address bus 61 directly to the physical page address.

The comparator circuit 935 is composed of comparators 9351–9354 each corresponds to a different one of the entries. The comparator circuit 935 acquires a logical address A [19:0] from the logical address bus 61, and compares the value of the acquired logical address with a generic logical address of each entry. On finding an entry of which the generic logical address matches the value, the comparator circuit 935 increments the degradation index and the access frequency index both by “1”.

Here, each generic logical address is a predetermined logical address that is accessed without an exception when a program routine allocated to a corresponding logical page is performed.

An example of such an address is an entry address of each program routine. Since an entry address is always accessed when a corresponding program routine is performed, it is suitably used to know if a logical page retaining the program routine is accessed.

<Conclusion>

As described above, the memory management apparatus according to the embodiment 3 holds, as access frequency indexes, cumulative counts each showing how many times a program routine allocated to a corresponding logical page has been called, and as degradation indexes, cumulative access counts each showing how many times a program routine retained in a corresponding physical page has been actually accessed.

Similarly to the access frequency indexes and the degradation indexes used in the embodiment 2, these values represent cumulative access counts of the logical pages and the cumulative degradation of the physical pages. Thus, by performing the physical page swapping based on these indexes, the degradation of the physical pages are made substantially uniform.

Since this structure does not employ cache memory, there is disadvantage of suppressing neither the absolute number of accesses nor local degradation within each physical page. Yet, when applied to usage in which the above disadvantage is permissible, the usable life of an FeRAM is maximized through the use of the compact memory management apparatus that is structured without cache memory.

EMBODIMENT 4

A memory management apparatus according to an embodiment 4 of the present invention accesses target memory via an n-way set associative cache. The memory management apparatus of this embodiment equalizes time periods during which cache data resides on a same line in the different ways, whereby an access to physical pages to replace data cached to the same lines is required to be made at substantially even frequencies.

To this end, the memory management apparatus of this embodiment pre-stores an evaluation value of the access frequency for each logical page. When a piece of currently stored cache data needs to be replaced in order to cache a new piece of data, the memory management apparatus refers to the access frequencies evaluated for the logical pages to which the new piece of data and each piece of the currently cached data are allocated. The memory management apparatus then replaces with the new piece of data, apiece of currently cached data of which an access frequency is smaller than the access frequency of the new piece of data.

Hereinafter, description is given to the memory management apparatus with reference to FIGS. 20–23.

<Overall Structure>

The structures of the memory management apparatus of the embodiment 4 and of a computer system including the memory management apparatus are similar to the ones described in the embodiment 1 (see FIG. 1).

<TLB 13>

The TLB 13 pre-stores, in the access frequency index column 123, access frequency indexes each indicating an access frequency of a logical page evaluated through a simulation, for example. As one example, description herein is given on the precondition that the access frequency indexes are average counts of an access request by specifying a corresponding logical page over a predetermined unit time. The access frequency indexes serve as the factor to determine which piece of cache data is to be replaced.

FIG. 20 shows one example of the access frequency indexes stored in the TLB 13 in the embodiment 4. As shown in the figure, the TLB 13 holds, in the access frequency index column, the evaluated access frequency indexes “4”, “2”, “1”, “1”, and “1” for the physical pages 0, 1, 2, 3, and 4, respectively. In the embodiment 4, the access frequency indexes are not updated.

<Cache Memory 12>

The cache memory 12 caches data into a cache data column. In addition, the cache memory 12 stores into a cache access frequency column, an access frequency index evaluated in advance for a logical page to which the original data of the cache data is allocated. The cache access frequency indexes are equivalent to replication access frequencies recited in the claims.

The thus stored access frequency indexes are decremented by "1" each time a corresponding piece of cache data is accessed. Accordingly, the cache access frequency index column shows how many more accesses are expected to a corresponding piece of cache data within the predetermined unit time.

<Replace Target Determination Process>

Now, description is given to a replace target determination process performed by the memory management apparatus 10.

This process may be performed by a hardware circuit constituting the control circuit 11, by the control circuit 11 operating according to a program stored in the ROM 40, or by the control circuit 11 operating under the instructions issued from the CPU 20 according to a program stored in the ROM 40.

Practically, the variables mentioned in the following description are implemented by the RAM 30 or a register that is included in the control circuit 11.

The replace target determination process is carried out in the state where the same line of all the ways of the cache memory 12 already stores valid cache data (i.e., the valid bit is "1") and when an access request is made to data to be newly cached to one of those lines. Through the process, a piece of cache data to be replaced with the new piece of data is determined.

Figure 21:
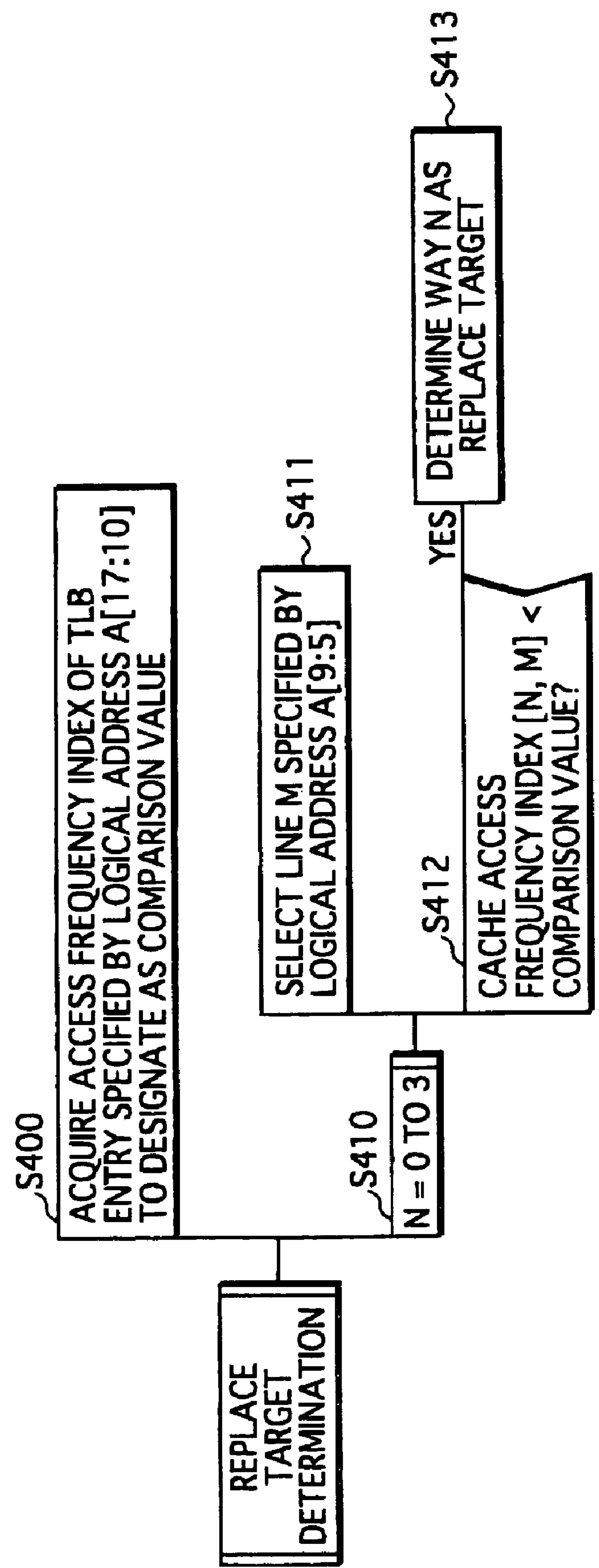
FIG. 21 is a PAD showing a replace target determination process.

FIG. 21 is a PAD showing the replace target determination process. This process employs variables N and M. Here, the variable N is a parameter specifying a way, and the variable M is a parameter specifying a line.

The control circuit 11 first selects an entry of the TLB 13 according to the middle bits A [17:10] of the logical address specifying the new piece of data, and acquires an access frequency index included in the selected entry. The thus acquired access frequency index is designated as a comparison value (S400). The control circuit 11 then sequentially targets each Way N (S410) to perform steps up to S412.

Regarding the line M shown by the middle bit A [9:5] of the logical address (S411), the control circuit 11 determines the way N as a replace target if the cache access frequency index [N, M] is smaller than the comparison value (step S412–S413).

Through this process, when data is newly cached, the data is a replaced with currently stored cache data of which a remaining access count expected within the predetermined unit time is smaller than that of the newly cached data. That is to say, each piece of currently stored cache data is retained in the cache memory if it is expected to be accessed for a grater number of times than an access expected to be made to the new data. Consequently, time periods during which each piece of cache data resides in the cache memory are substantially equalized.

<Decision Circuit>

Now, description is given to a decision circuit that performs the replace target determination process by hardware implementation.

Figure 22:
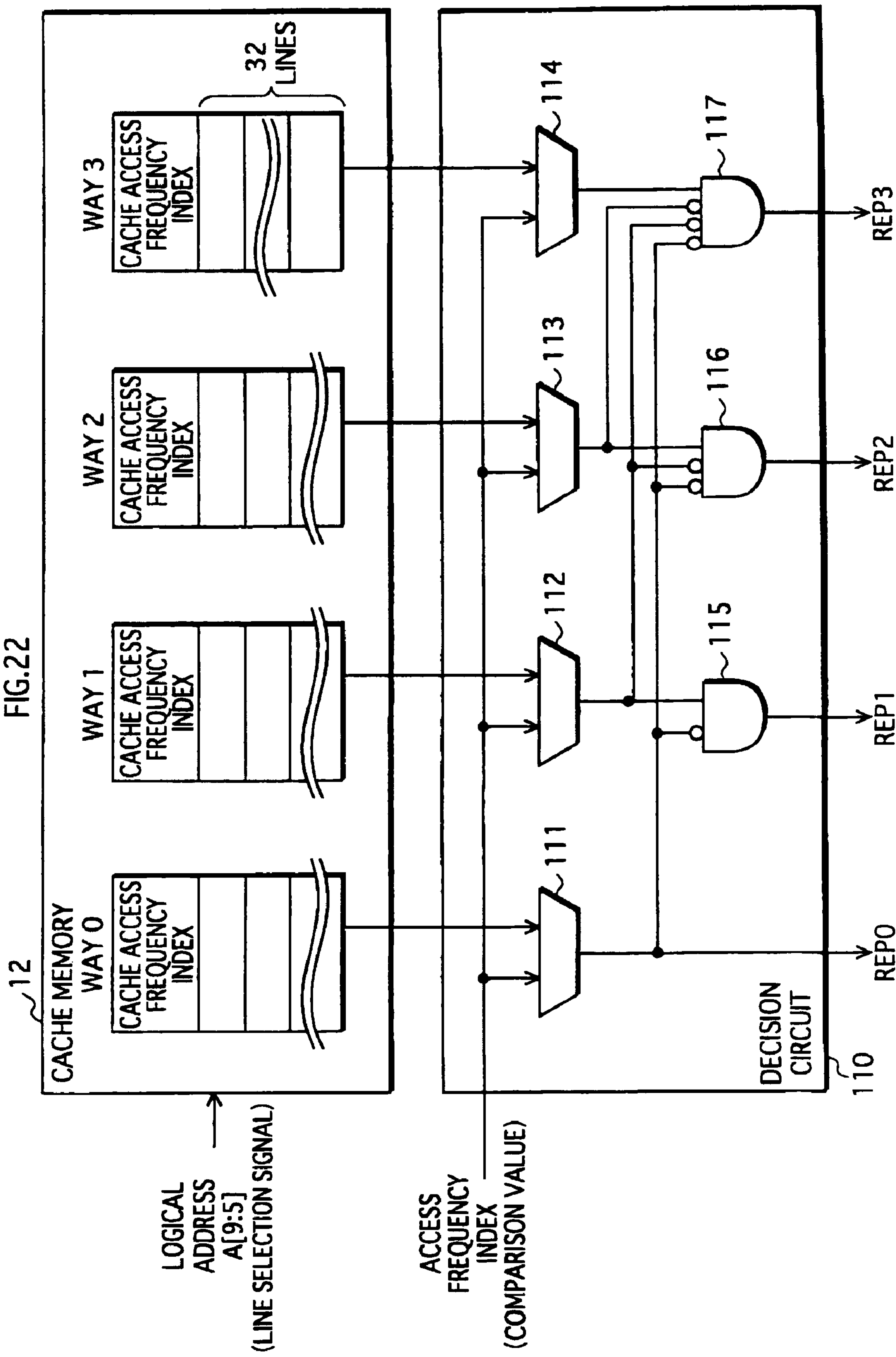
FIG. 22 is a block diagram illustrating the structure of a decision circuit.

FIG. 22 is a block diagram illustrating the structure of a decision circuit 110. The figure also shows the cache memory 12 which supplies a cache access frequency index to the decision circuit 110. The decision circuit 110 may be implemented as a part of the control circuit 11.

The decision circuit 110 is composed of comparators 111–114 provided correspondingly to a different one of the ways of the cache memory, and of gates 115–117 that generate selection signals in response to outputs from the comparators 111–114.

Suppose the logical address A (19:0) specifies data to be newly cached, each way of the cache memory 12 supplies a cache access frequency index held in the line selected by the bits A [9:5] to a corresponding comparator. At the same time, the TLB 13 supplies to each comparator, the access frequency index of the entry that is selected according to the bits of the logical address A [17:10] as a comparison value.

In response, if the supplied comparison value is greater than the supplied cache access frequency index, each comparator outputs a logical value "1" indicating that a corresponding way is selectable as a replace target. Through the gates 115–117, outputs from the comparators 112–114 that correspond to Ways 1–3 are sequentially restricted to one output that is from a comparator corresponding to a smaller number of way. Consequently, one out of decision signals REP0–REP3 is outputted and the output corresponds to a smallest number of way among all the ways selectable as a replacement target.

The control circuit 11 then replaces cache data stored in the way selected according to the decision signal.

SPECIFIC EXAMPLE

Now, description is given using a specific example to show that degradation of the physical pages in the FeRAM 50 is leveled by the memory management apparatus 10 replacing cache data of the way that is determined through the above replace target determination process.

Figure 23:
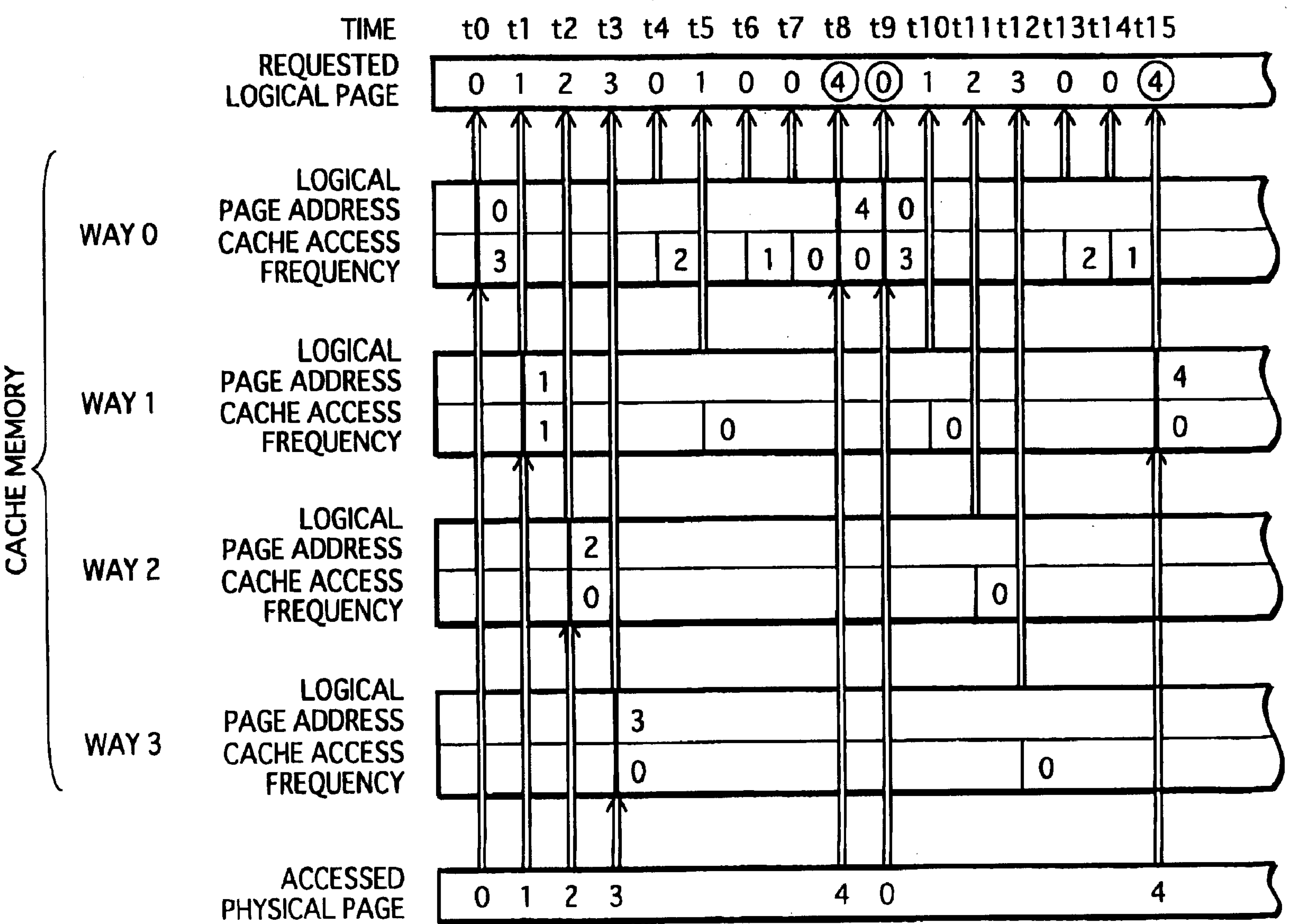
FIG. 23 is a timing chart showing time-varying changes in data.
Figure 24:
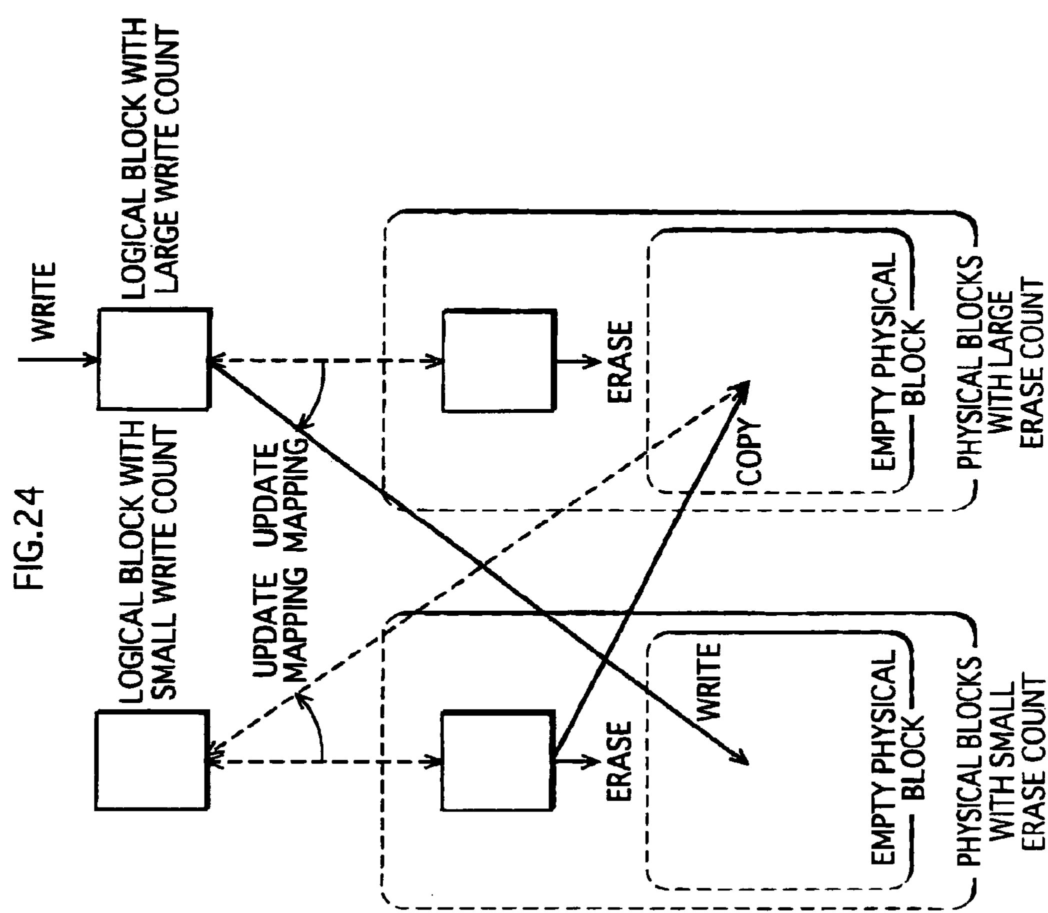
FIG. 24 illustrates a conventional memory management technique.

FIG. 23 is a timing chart schematically showing requested physical pages, the contents of the cache memory, and accessed physical pages in time sequence. Here, the contents of the TLB 13 are as shown in FIG. 20.

In the figure, a circle enclosing a logical page number represents an access request requiring cache data replacement. Further, the figure shows the contents of the logical page address column and of the cache access frequency index column in the same line of each way.

Throughout the time period illustrated in the figure, the logical pages 0–4 are mapped to the physical pages 0–4, respectively, and no changes in the mapping takes place. That is to say, each logical page and a corresponding physical page is denoted by a same page number throughout the time period.

Hereinafter, description is given in time sequence.

(Time t0–t3)

At the point of time t0, none of the ways holds valid cache data, and an access request is issued for data allocated to the logical page 0. In response, the requested data is cached to Way 0, and the logical page address and the cache access frequency index in Way 0 are updated to"00" and "3", respectively.

This value "3" held as the cache access frequency index is acquired in the following way. The access frequency index evaluated for the logical page 0 is "4", and after the access frequency index is cached, this value "4" is decremented by "1" for one cache accesses.

During the time period t1–t3, access requests are sequentially made for data allocated to the logical pages 1–3, and the similar process is performed for Ways 1–3.

(Time t4–t7)

In response to each access request, the cache data is accessed, and the cache access frequency index is decremented accordingly.

(Time t8)

At the point of the time t8, all of the ways store valid cache data. In this state, an access request is made for data on a same line of a logical page 4 that is not cached Consequently, it is required to replace a piece of currently cached data.

At this stage, the replace target determination process described above is performed. The logical page 4 to which data to be cached is allocated has the access frequency index "1". Accordingly, Way 0 is determined as the replace target because Way 0 is the smallest number way among all the ways storing a cache access frequency index smaller than "1". Then, the requested data allocated to the logical page 4 is newly cached, and the logical page address and the cache access frequency index are set to "4" and "0", respectively.

(Time t9)

At the point of time t9, an access request is made for data allocated to the logical page 0. The access frequency index of the logical page 0 is "4", so that Way 0 is determined as a replace target because Way 0 is a smallest number way among all the ways storing a cache access frequency index smaller than "4". The requested data allocated to the logical page 0 is then newly cached, and the logical page address and the cache access frequency index are set to "0" and "3", respectively.

(Time t10–t14)

In response to each access request, cache data is accessed, and the cache access frequency index is decremented accordingly. Note that the cache access frequency index is not decremented to be smaller than "0".

(Time t15)

An access request is made for data allocated to the logical page 4. The access frequency index of the logical page 4 is "1", so that a smallest number way among all the ways holding an access frequency index is smaller than "1" is selected as the replace target. The requested data allocated to the logical page 4 is then newly cached, and the logical page address and the cache access frequency index are set to "4" and "0", respectably.

<Conclusion>

As described above, when a piece of currently stored cache data needs to be replaced, the memory management apparatus according the embodiment 4 replaces cache data which is expected to be accessed in the predetermined unit time for a smaller number of times than that expected to the data to be newly cached. With this arrangement, a time period during which cache data resides on each way is made substantially even.

This means that the replacement frequency of each piece of cache data is made substantially even. Consequently, the access frequency of each physical page resulting from cache data replacement is equalized, so that degradation of physical pages is leveled.

<Modifications>

Up to this point, the present invention has been described by way of the specific embodiments above. Yet, it is naturally appreciated that the present invention is in no way limited to those specific embodiments. The following modifications still fall within the scope of the present invention.

(1) The present invention may be embodied as a computer program to be executed by a computer system for realizing any of the methods described in the above embodiments or as a digital signal representing the computer program.

Further, the present invention may be embodied as a computer-readable recording medium storing the above computer program or digital signal. Examples of such a computer-readable recording medium include a flexible disk, a hard disk, a CD-ROM, an MO (Magneto-Optical) disc, a DVD (Digital Versatile Disc), or a semiconductor memory.

Still further, the present invention may be embodied as the above computer program or digital signal that is transmitted via a network, such as an electronic communications network, a wired or wireless communications network, or the Internet.

Still further, the above program or digital signal may be transferred to an independent computer system in form of a recording medium mentioned above or via any of the above network. The independent computer system may then execute the computer program or digital signal.

2) The memory management apparatus according to the embodiment 1 stores, through the cache flush and TLB update process, a peak value of cache access frequency indexes as an access frequency index of a logical page to which cache data belongs, and subsequently invalidates all the pieces of cache data at the same time.

Accordingly, each time period for which a peak value is acquired is made constant, which allows peak values acquired for each piece of cache values to be compared directly as they are.

In one alternative, in the cache flush and TLB update process, a cache access frequency index may be normalized using a time period during which a corresponding piece of cache data resides in the cache memory. Thus, a peak value of normalized cache access frequency indexes is used for the subsequent process.

Here, the nominalization using the time period during which cache data resides means to divide a cache access frequency index by the duration of the regular operation, i.e., the time period during which the cache access frequency index is kept counting of.

With this structure, even if access frequency indexes are acquired for piece of cache data each resides in the cache memory for different length of time periods, the normalized peak values acquired for direct comparison with one another. This eliminates the need to invalidate all the piece of cache data collectively at the same time, which serves to reduce the absolute number of accesses.

(3) The memory management apparatus according to the embodiment 3 uses, as one example, an entry address of each program routine as a generic logical address.

In one alternative, in view of the memory management by the memory management apparatus, it is applicable to explicitly insert into each program routine, an instruction that is always executed whenever a corresponding program routine is executed. Here, the address of that instruction is determined as a generic logical address. In another alternative, when each program routine includes iterative process, it is applicable to explicitly include an instruction that is always executed for each iteration, so that the address of the instruction is determined as a generic logical address.

(4) In one alternative, the memory management apparatus according to the embodiment 4 may select as a cache data replacement target, apiece of cache data of which a cache access frequency index is the smallest, i.e., a piece of cache data to which an access within the predetermined unit time is expected to be made for a smallest number of times.

With this structure, when cache date needs to be replaced, to be replaced first is a piece of cache data that has been already accessed more than a number of times estimated to be made within the predetermined unit time. This serves to equalize time periods during which each piece of cache data resides in the cache memory.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A memory management apparatus for accessing a physical page mapped according to mapping information to a logical page that includes a logical address specified by an access request, the mapping information showing a one-to-one mapping between a plurality of logical pages and a plurality of physical pages, the logical pages being defined by dividing a logical address space by a predetermined size, each of the physical pages functioning to physically retain data of the predetermined size and degrading in storage performance each time an access is made thereto, the apparatus comprising:

an access frequency index storage unit operable to store an access frequency index for each logical page, the access frequency index indicating an occurrence frequency of an access request specifying a logical address included in a corresponding logical page;

a degradation index storage unit operable to store a degradation index for each physical page, the degradation index indicating a degree of degradation in storage performance of a corresponding physical page;

a degradation leveling unit operable to (i) exchange retained data between a first physical page and a second physical page, the first physical page being mapped according to the mapping information to a specific logical page of which the access frequency index is greater than or equal to a first threshold, and the second physical page having the degradation index that is less than or equal to a second threshold, and (ii) update the mapping information so as to show that the specific logical page is mapped to the second physical page;

a cache storage unit operable to store, for each of up to a predetermined number of the physical pages, cache data that is a copy of data retained in a corresponding physical page and that is accessed instead of the original data, and to write, if cache data has been modified as a result of a subsequent access, the modified cache data back to a corresponding physical page;

a degradation index updating unit operable to add a first value to a degradation index of each physical page that retains original data of cache data stored in the cache storage unit, and add a second value to a degradation index of each physical page to which modified cache data has been written back; and an access frequency index updating unit operable to add the first value to the access frequency index of a logical page that is mapped according to the mapping information to each physical page retaining original data of cache data stored in the cache storage unit, and to add the second value to the access frequency index of a logical page that is mapped according to the mapping information to each physical page to which modified cache data has been written back.

2. The memory management apparatus according to claim 1, wherein each physical page is implemented by a ferroelectric random access memory.

3. A memory management apparatus for accessing a physical page mapped according to mapping information to a logical page that includes a logical address specified by an access request, the mapping information showing a one-to-one mapping between a plurality of logical pages and a plurality of physical pages, the logical pages being defined by dividing a logical address space by a predetermined size, each of the physical pages functioning to physically retain data of the predetermined size and degrading in storage performance each time an access is made thereto, the apparatus comprising:

an access frequency index storage unit operable to store an access frequency index for each logical page, the access frequency index indicating an occurrence frequency of an access request specifying a logical address included in a corresponding logical page;

a degradation index storage unit operable to store a degradation index for each physical page, the degradation index indicating a degree of degradation in storage performance of a corresponding physical page;

a degradation leveling unit operable to (i) exchange retained data between a first physical page and a second physical page, the first physical page being mapped according to the mapping information to a specific logical page of which the access frequency index is greater than or equal to a first threshold, and the second physical page having the degradation index that is less than or equal to a second threshold, and (ii) update the mapping information so as to show that the specific logical page is mapped to the second physical page;

a cache storate unit operable to store, for each of up to a predetermined number of the physical pages, cache data that is a copy of data retained in a corresponding physical page and that is accessed instead of the original data, and to write, if cache data has been modified as a result of a subsequent access, the modified cache data back to a corresponding physical page; and a degradation index updating unit operable to add a first value to the degradation index of each physical page that retains original data of cache data stored in the cache storage unit, and add a second value to the degradation index of each physical page to which modified cache data has been written back, wherein the cache data storage unit further stores, at a time of storing cache data, the cache access frequency index for the cache data, an initial value of the cache access frequency index being set to "0", the memory management apparatus further comprising:

a cache access frequency index updating unit operable to increment the cache access frequency index of cache data in response to an access to the cache data; and an access frequency index updating unit operable to compare, for each piece of cache data, (i) the access frequency index of a logical page that is mapped according to the mapping information to a physical page retaining original data of a corresponding piece of cache data and (ii) the cache access frequency index of the corresponding piece of cache data, and to update the access frequency index with the cache access frequency index if the cache access frequency index is greater than the access frequency index.

4. The memory management apparatus according to claim 3, wherein each physical page is implemented by a ferroelectric random access memory.

5. A memory management method for accessing a physical page mapped according to mapping information to a logical page that includes a logical address specified by an access request, the mapping information showing a one-to-one mapping between a plurality of logical pages and a plurality of physical pages, the logical pages being defined by dividing a logical address space by a predetermined size, each of the physical pages functioning to physically retain data of the predetermined size and degrading in storage performance each time an access is made thereto, the method comprising:

an access frequency index storing step of storing an access frequency index for each logical page, the access frequency index indicating an occurrence frequency of an access request specifying a logical address included in a corresponding logical page, a degradation index storage step of storing a degradation index for each physical page, the degradation index indicating a degree of degradation in storage performance of a corresponding physical page;

a degradation leveling step of (i) exchanging retained data between a first physical page and a second physical page, the first physical page being mapped according to the mapping information to a specific logical page of which the access frequency index is greater than or equal to a first threshold, and the second physical page having the degradation index that is less than or equal to a second threshold, and (ii) updating the mapping information so as to show that the specific logical page is mapped to the second physical page;

a cache storage step of storing, for each of up to a predetermined number of the physical pages, cache data that is a copy of data retained in a corresponding physical page and that is accessed instead of the original data, and to write, if cache data has been modified as a result of a subsequent access, the modified cache data back to a corresponding physical page;

a degradation index updating step of adding a first value to the degradation index of each physical page that retains original data of cache data stored in the cache storage unit, and adding a second value to the degradation index of each physical page to which modified cache data has been written back; and an access frequency index updating step of adding the first value to the access frequency index of a logical page that is mapped according to the mapping information to each physical page retaining original data of cache data stored in the cache storage unit, and adding the second value to the access frequency index of a logical page that is mapped according to the mapping information to each physical page to which modified cache data has been written back.

6. A memory management method for accessing a physical page mapped according to mapping information to a logical page that includes a logical address specified by an access request, the mapping information showing a one-to-one mapping between a plurality of logical pages and a plurality of physical pages, the logical pages being defined by dividing a logical address space by a predetermined size, each of the physical pages functioning to physically retain data of the predetermined size and degrading in storage performance each time an access is made thereto, the method comprising:

an access frequency index storage step of storing an access frequency index for each logical page, the access frequency index indicating an occurrence frequency of an access request specifying a logical address included in a corresponding logical page;

a degradation index storage step of storing a degradation index for each physical page, the degradation index indicating a degree of degradation in storage performance of a corresponding physical page;

a degradation leveling step of (i) exchanging retained data between a first physical page and a second physical page, the first physical page being mapped according to the mapping information to a specific logical page of which the access frequency index is greater than or equal to a first threshold, and the second physical page having the degradation index that is less than or equal to a second threshold, and (ii) updating the mapping information so as to show that the specific logical page is mapped to the second physical page;

a cache storing step of storing, for each of up to a predetermined number of the physical pages, cache data that is a copy of data retained in a corresponding physical page and that is accessed instead of the original data, and writing, if cache data has been modified as a result of a subsequent access, the modified cache data back to a corresponding physical page; and a degradation index updating step of adding a first value to the degradation index of each physical page that retains original data of cache data stored in the cache storage unit, and adding a second value to the degradation index of each physical page to which modified cache data has been written back, wherein the cache data storing step further stores, at a time of storing cache data, a cache access frequency index for the cache data, an initial value of the cache access frequency index being set to "0", the memory management method further comprising:

a cache access frequency index updating step of incrementing a cache access frequency index of cache data in response to an access to the cache data; and an access frequency index updating step of comparing, for each piece of cache data, (i) an access frequency index of a logical page that is mapped according to the mapping information to a physical page retaining original data of a corresponding piece of cache data and (ii) a cache access frequency index of the corresponding piece of cache data, and updating the access frequency index with the cache access frequency index if the cache access frequency index is greater than the access frequency index.

* * * * *